(12) United States Patent
Iwamoto et al.

(10) Patent No.: US 12,037,052 B2
(45) Date of Patent: Jul. 16, 2024

(54) WORKING MACHINE

(71) Applicant: KUBOTA CORPORATION, Osaka (JP)

(72) Inventors: Teruhiko Iwamoto, Sakai (JP); Toshihiro Nakao, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 738 days.

(21) Appl. No.: 17/110,749

(22) Filed: Dec. 3, 2020

(65) Prior Publication Data

US 2021/0086847 A1 Mar. 25, 2021

Related U.S. Application Data

(63) Continuation of application No. PCT/JP2019/022409, filed on Jun. 5, 2019.

(30) Foreign Application Priority Data

| Jun. 29, 2018 | (JP) | 2018-125489 |
| Jun. 29, 2018 | (JP) | 2018-125490 |
| Jun. 29, 2018 | (JP) | 2018-125491 |
| Jun. 29, 2018 | (JP) | 2018-125492 |
| Jun. 29, 2018 | (JP) | 2018-125493 |
| Jun. 29, 2018 | (JP) | 2018-125494 |
| Jun. 29, 2018 | (JP) | 2018-125495 |

(51) Int. Cl.
*B62D 49/06* (2006.01)
*B62D 1/16* (2006.01)

(52) U.S. Cl.
CPC .......... *B62D 49/0692* (2013.01); *B62D 1/16* (2013.01)

(58) Field of Classification Search
CPC .................. B62D 49/0692; B62D 1/16; B60K 2370/131; B60K 2370/135; B60K 2370/139; B60K 37/06; B60K 35/00; E02F 9/2004; H01H 9/20; H01H 9/28; H01H 9/287

See application file for complete search history.

(56) References Cited

U.S. PATENT DOCUMENTS

| 3,857,454 A | 12/1974 | Kobayashi et al. |
| 4,655,308 A * | 4/1987 | Kraus ................. B60Q 1/1461 |
| | | 74/552 |

(Continued)

FOREIGN PATENT DOCUMENTS

| EP | 3 210 834 A1 | 8/2017 |
| JP | 59-51423 U | 4/1984 |

(Continued)

*Primary Examiner* — Laura Freedman
(74) *Attorney, Agent, or Firm* — Birch, Stewart, Kolasch & Birch, LLP

(57) ABSTRACT

A working machine includes a steering, a steering post supporting the steering, and a steering column covering the steering post. The steering column has a switch panel arranged below the steering on an upper surface of the steering column, and the switch panel has a first switch group including a plurality of switches arranged to have an inclining configuration in plan view where the switches align in a machine outward direction as shifting forward, the first switch group being arranged on both sides of the steering post in a machine width direction.

9 Claims, 29 Drawing Sheets

(56) References Cited

U.S. PATENT DOCUMENTS

| | | | | |
|---|---|---|---|---|
| 5,924,515 | A | * | 7/1999 | Stauffer ............... A01D 67/04 180/326 |
| 5,938,282 | A | * | 8/1999 | Epple ................... B60N 2/797 180/315 |
| 6,039,141 | A | * | 3/2000 | Denny .................. B60N 2/14 296/190.01 |
| 6,061,617 | A | * | 5/2000 | Berger .................. E02F 3/438 701/34.2 |
| 7,484,587 | B2 | | 2/2009 | Portscheller et al. |
| 7,635,045 | B2 | * | 12/2009 | Shearer ................ E02F 9/2004 180/315 |
| 8,240,738 | B2 | * | 8/2012 | Shiratori .................. B62J 6/16 200/61.54 |
| 8,626,407 | B2 | * | 1/2014 | Fujimoto ............. B60K 35/00 701/50 |
| 8,684,120 | B2 | * | 4/2014 | Suneya ................. B60K 37/00 296/72 |
| 9,257,242 | B2 | * | 2/2016 | Abe ......................... E02F 9/16 |
| 9,315,103 | B2 | * | 4/2016 | Yamauchi ................ G05G 1/62 |
| 9,370,175 | B2 | * | 6/2016 | Swinney, II .......... B05B 15/20 |
| 9,859,074 | B1 | * | 1/2018 | Martinez ................ H01H 23/04 |
| 10,026,242 | B2 | * | 7/2018 | Tanaka .................. B60K 37/02 |
| 10,940,901 | B2 | * | 3/2021 | Miyazaki ................. G05G 1/01 |
| 11,314,274 | B2 | * | 4/2022 | Kosaki ..................... G05G 1/06 |
| 11,541,951 | B2 | * | 1/2023 | Kosaki ..................... B60N 2/797 |
| 2001/0017228 | A1 | | 8/2001 | Inaoka et al. |
| 2003/0057065 | A1 | * | 3/2003 | Hecker .................. H01H 23/14 200/43.16 |
| 2007/0289803 | A1 | | 12/2007 | Yoshikawa et al. |
| 2014/0003900 | A1 | * | 1/2014 | Hyodo .................... E02F 3/431 414/685 |
| 2015/0275480 | A1 | | 10/2015 | Iwamoto |
| 2016/0053779 | A1 | | 2/2016 | Komatsu et al. |
| 2017/0217473 | A1 | * | 8/2017 | Higashiguchi ......... B62D 1/189 |
| 2017/0217510 | A1 | | 8/2017 | Iwata |
| 2019/0382984 | A1 | * | 12/2019 | Hagiwara ............... E02F 3/841 |
| 2020/0180713 | A1 | * | 6/2020 | Kosaki ..................... G05G 1/02 |
| 2020/0307693 | A1 | * | 10/2020 | Kobayashi ............. B62D 49/08 |
| 2020/0398780 | A1 | * | 12/2020 | Kobayashi ........... A01B 69/008 |
| 2021/0300460 | A1 | * | 9/2021 | Misaki .................. B62D 1/187 |
| 2022/0192073 | A1 | * | 6/2022 | Gono ................... A01B 63/008 |
| 2022/0228345 | A1 | * | 7/2022 | Case ....................... E02F 3/283 |
| 2022/0243424 | A1 | * | 8/2022 | Takano ..................... E02F 9/00 |
| 2023/0026510 | A1 | * | 1/2023 | Vonroth ................. B60K 37/06 |

FOREIGN PATENT DOCUMENTS

| | | | |
|---|---|---|---|
| JP | 1-182417 | A | 7/1989 |
| JP | 4-80434 | A | 3/1992 |
| JP | 7-207696 | A | 8/1995 |
| JP | 7-207705 | A | 8/1995 |
| JP | 8-40223 | A | 2/1996 |
| JP | 8-108741 | A | 4/1996 |
| JP | 2960847 | B2 | 10/1999 |
| JP | 2001-199283 | A | 7/2001 |
| JP | 2003274735 | A * | 9/2003 |
| JP | 2005-256408 | A | 9/2005 |
| JP | 2005-336771 | A | 12/2005 |
| JP | 2006-83996 | A | 3/2006 |
| JP | 2006111047 | A * | 4/2006 |
| JP | 2007-38821 | A | 2/2007 |
| JP | 2007-91055 | A | 4/2007 |
| JP | 2007-146582 | A | 6/2007 |
| JP | 2008-149942 | A | 7/2008 |
| JP | 2013-36258 | A | 2/2013 |
| JP | 2015-186939 | A | 10/2015 |
| JP | 2016-17338 | A | 2/2016 |
| JP | 2016-41565 | A | 3/2016 |
| JP | 2016-78826 | A | 5/2016 |
| WO | WO 2008/062868 | A1 | 5/2008 |
| WO | WO 2010/140514 | A1 | 12/2010 |

* cited by examiner

WORKING MACHINE

CROSS-REFERENCE TO RELATED APPLICATIONS

The present application is a continuation application of International Application No. PCT/JP2019/022409, filed Jun. 5, 2019, which claims priority to Japanese Patent Application No. 2018/125489, filed Jun. 29, 2018, to Japanese Patent Application No. 2018/125490, filed Jun. 29, 2018, to Japanese Patent Application No. 2018/125491, filed Jun. 29, 2018, to Japanese Patent Application No. 2018/125492, filed Jun. 29, 2018, to Japanese Patent Application No. 2018/125493, filed Jun. 29, 2018, to Japanese Patent Application No. 2018/125494, filed Jun. 29, 2018, and to Japanese Patent Application No. 2018/125495, filed Jun. 29, 2018. The contents of these applications are incorporated herein by reference in their entirety.

BACKGROUND OF THE INVENTION

Field of the Invention

The present invention relates to a working machine such as a wheel loader.

Description of Related Art

The working machines disclosed in Japanese Patent Publication No. 2960847, Japanese Unexamined Patent Publication No. 2007-146582, Japanese Unexamined Patent Publication No. 2013-36258, Japanese Unexamined Patent Publication No. H07-207705, Japanese Unexamined Patent Publication No. 2015-186939, and Japanese Unexamined Patent Publication No. H08-40223 are known.

The working machine disclosed in Japanese Patent Publication No. 2960847 has a steering wheel and a steering column covering a steering post which supports the steering wheel. A switch panel is provided on the upper side of the steering column and below the steering wheel, and a plurality of switches are provided on the switch panel.

The working machine disclosed in Japanese Unexamined Patent Publication No. 2007-146582 has a lift arm mounted vertically pivotally on the front of the machine body, and a working tool is mounted on the lift arm. The lift arm is provided with a quick coupler for attaching the working tool to the lift arm. The quick coupler is provided with a connector pin for connecting the lift arm to the working tool.

The working machine disclosed in Japanese Unexamined Patent Publication No. 2013-36258 has a first arm and a second arm extending forward from the machine body and spaced in the width direction of the machine body. A working tool provided with a hydraulic actuator can be mounted in front of the first and second arms. An auxiliary control valve for controlling the hydraulic actuator provided with the working tool is provided on the side of the machine body.

The working machine disclosed in Japanese Unexamined Patent Publication No. H07-207705 has a steering column located at the front of the interior of the cabin on the machine body. A brake pedal is provided on the side of the steering column.

The working machine disclosed in Japanese Unexamined Patent Publication No. 2015-186939 has a cabin. A operator seat is provided in the interior of the cabin. A steering column is provided in front of the operator seat and an air conditioner main body is provided below the operator seat.

The working machine disclosed in Japanese Unexamined Patent Publication No. 2015-186939 has an air conditioner main body, which is a main part of an air conditioner device provided on the working machine.

The working machine disclosed in Japanese Unexamined Patent Publication No. H08-40223 has a steering column that supports the steering. A brake shaft extending in the width direction of the machine is rotatably supported in the steering column. A brake pedal rotatably mounted on the brake shaft is provided on a side of the steering column.

SUMMARY OF THE INVENTION

A working machine according to one aspect of the present invention, includes: a steering; a steering post supporting the steering; and a steering column covering the steering post. The steering column has a switch panel arranged below the steering on an upper surface of the steering column, and the switch panel has a first switch group including a plurality of switches arranged to have an inclining configuration in plan view where the switches align in a machine outward direction as shifting forward, the first switch group being arranged on both sides of the steering post in a machine width direction.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
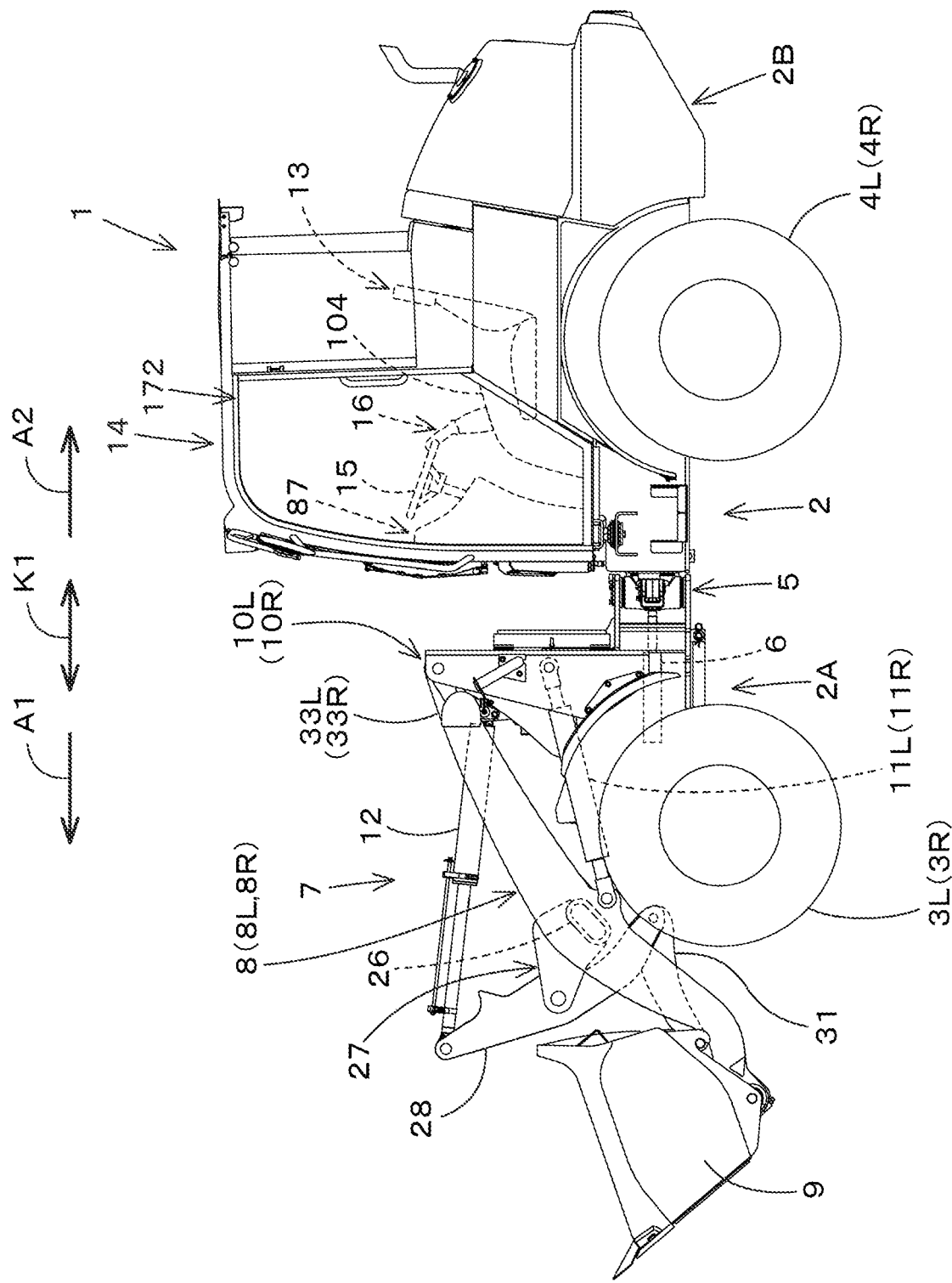
FIG. 1 is a side view of a working machine.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 2:
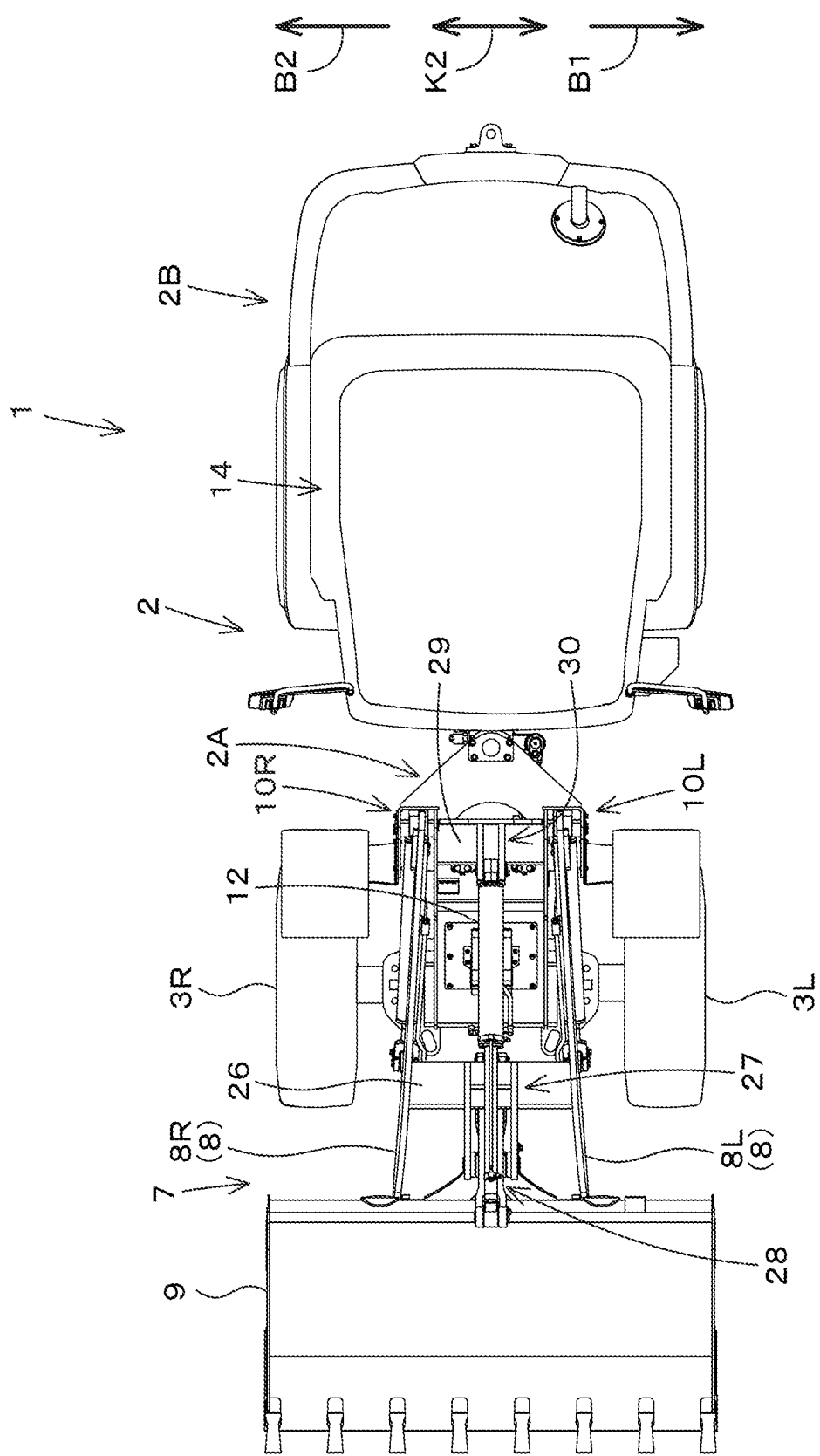
FIG. 2 is a plan view of a working machine.

FIG. 1 is a schematic side view showing the overall configuration of the working machine 1 in this embodiment. FIG. 2 is a schematic plan view of the working machine 1. In this embodiment, a wheel loader is illustrated as the working machine 1.

As shown in FIG. 1 and FIG. 2, the wheel loader of the present embodiment is an articulated working machine 1, and the machine body 2 of the working machine 1 includes a front machine body 2A and a rear machine body 2B. The front machine body 2A is provided with a left front wheel 3L and a right front wheel 3R. The front wheel 3L is provided on the left side of the front machine body 2A, and the front wheel 3R is provided on the right side of the front machine body 2A. A left rear wheel 4L and a right rear wheel 4R are provided in the rear machine body 2B. The rear wheel 4L is provided on the left side of the rear machine body 2B, and the rear wheel 4R is provided on the right side of the rear machine body 2B. The rear machine body 2B is provided with an operator seat (a driver seat) 13 in which an operator (driver) is seated. The operator seat 13 is located between the rear wheels 4L and the rear wheels 4R and is located in the center of a machine width direction K2 in the machine body 2.

In this embodiment, the front side of the operator seated on the operator seat 13 (a direction of an arrowed line A1 in FIG. 1 and FIG. 2) is described as the front, the rear side of the operator (a direction of an arrowed line A2 in FIG. 1 and FIG. 2) is described as the rear, the left side of the operator (a front surface side of FIG. 1 and a direction of an arrowed line B1 in FIG. 2) is described as the left, and the right side of the operator (a back surface side of FIG. 1 and a direction of an arrowed line B2 in FIG. 2) is described as the right. The horizontal direction, which is perpendicular to the front-to-rear direction K1, will be explained as the machine width direction K2 (see FIG. 2). The direction from the center of the machine body 2 in the width direction to the right or left is explained as an outward direction of the machine body. In other words, the outward direction of the machine body is the machine width direction K2 and a direction separating away from the center of the machine body 2 in the width direction. The direction opposite to the machine outward direction is explained as an inward direction of the machine body. In other words, the inward direction of the machine body is the machine width direction K2 that approaches the center of the machine body 2 in the width direction.

As shown in FIG. 1, a machine connector member 5 is provided on the front end side of the rear machine body 2B so as to be rotatable within a predetermined range around the axis center in the front-to-rear direction K1, and the rear end of the front machine body 2A is connected to the machine connector member 5 so as to be pivotally connected to the rear end of the front machine body 2A in the machine width direction K2 around the longitudinal axis center (the axis center extending in the vertical direction).

A steering cylinder 6 including a hydraulic cylinder is provided across the machine connector member 5 and the front machine body 2A. By stretching and shortening the steering cylinder 6, the front machine body 2A is pivoted in the machine width direction K2 with respect to the rear machine body 2B, allowing the working machine 1 to turn left and right.

The rear machine body 2B is provided with a cabin 14 as an operator seat protection device that houses the operator seat 13. The interior of the cabin 14 (hereinafter referred to as the cabin interior) is provided with a steering wheel 15 (handle wheel) for operating the steering cylinder 6 and an operation lever 16 for piloting the working machine 7. The steering wheel 15 is arranged in front of the operator seat 13, and the operation lever 16 is arranged on the side (right side) of the operator seat 13.

The rear machine body 2B is provided with a prime mover. The prime mover is a diesel engine. The prime mover may be a gasoline engine, an LPG engine or an electric motor, or a hybrid type having an engine and an electric motor. The operator seat protection device may be a canopy.

As shown in FIG. 1 and FIG. 2, a working device 7 (front working device) is provided on the front machine body 2A. The working device 7 has a lift arm 8 supported vertically and pivotally on the front machine body 2A (machine body 2). The lift arm 8 has a first arm 8L on the left and a second arm 8R on the right, spaced in the machine width direction K2. The first arm 8L is freely rotatably supported on the upper portion of the first support frame 10L, whose base end (rear end side) is erected on the left side of the front machine body 2A, around an axis center extending in the machine width direction K2. Thus, the first arm 8L can be pivoted up and down. The second arm 8R is rotatably supported on the upper portion of the second support frame 10R, whose base end is erected on the right side of the front machine body 2A, in the upper portion of the second support frame 10R extending in the machine width direction K2, rotatably supported around the axial center extending in the machine width direction K2. Thus, the second arm 8R can also be pivoted up and down. A work light (lamp) 33L is provided on the left side of the upper portion of the first support frame 10L. A work light (lamp) 33R is also provided on the upper right side of the upper portion of the second support frame 10R.

Figure 5:
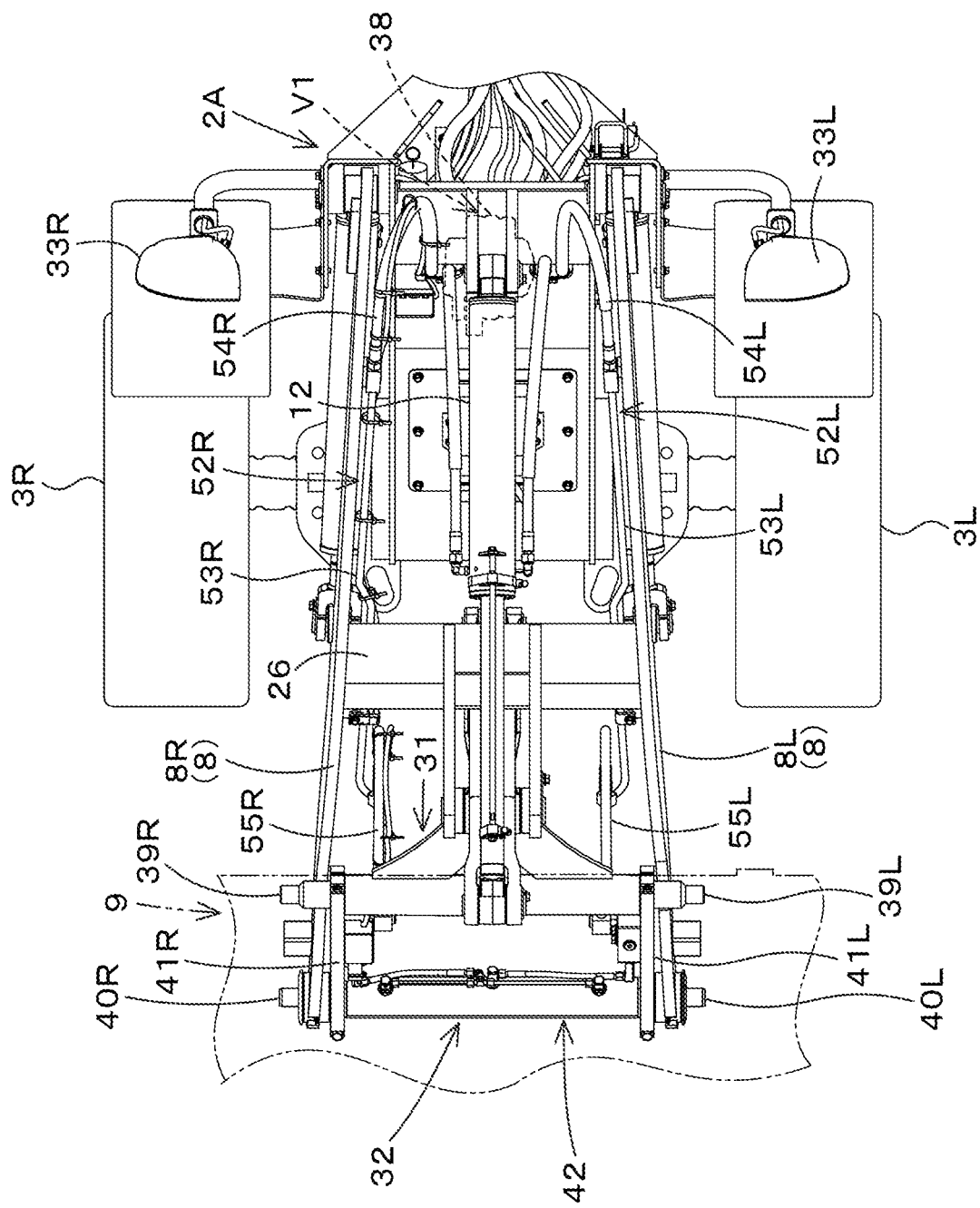
FIG. 5 is a plan view of a front portion of a working machine.

As shown in FIG. 5, the first arm 8L and the second arm 8R are spaced apart in the machine width direction K2, and the spacing is progressively widened as the distance between the arms increases forward. This improves the left- and right-angle forward visibility of an operator seated on the operator seat 13. In addition, when checking the status of the first pin 40L and the second pin 40R (connected or disconnected), which will be described later, the operator can do so without moving his or her body much. In other words, the ease of checking the status of the first pin 40L and the second pin 40R can be increased. It is also easier to check the front wheels 3L and 3R. This makes it easy to work with the front wheels 3L and 3R while looking at the front wheels 3L and 3R. It is also possible to work while looking at the outer side of the machine body of the working tool 9. For example, when a pallet fork is mounted as the working tool 9, it is possible to work while looking at the toe of the pallet fork.

Figure 7:
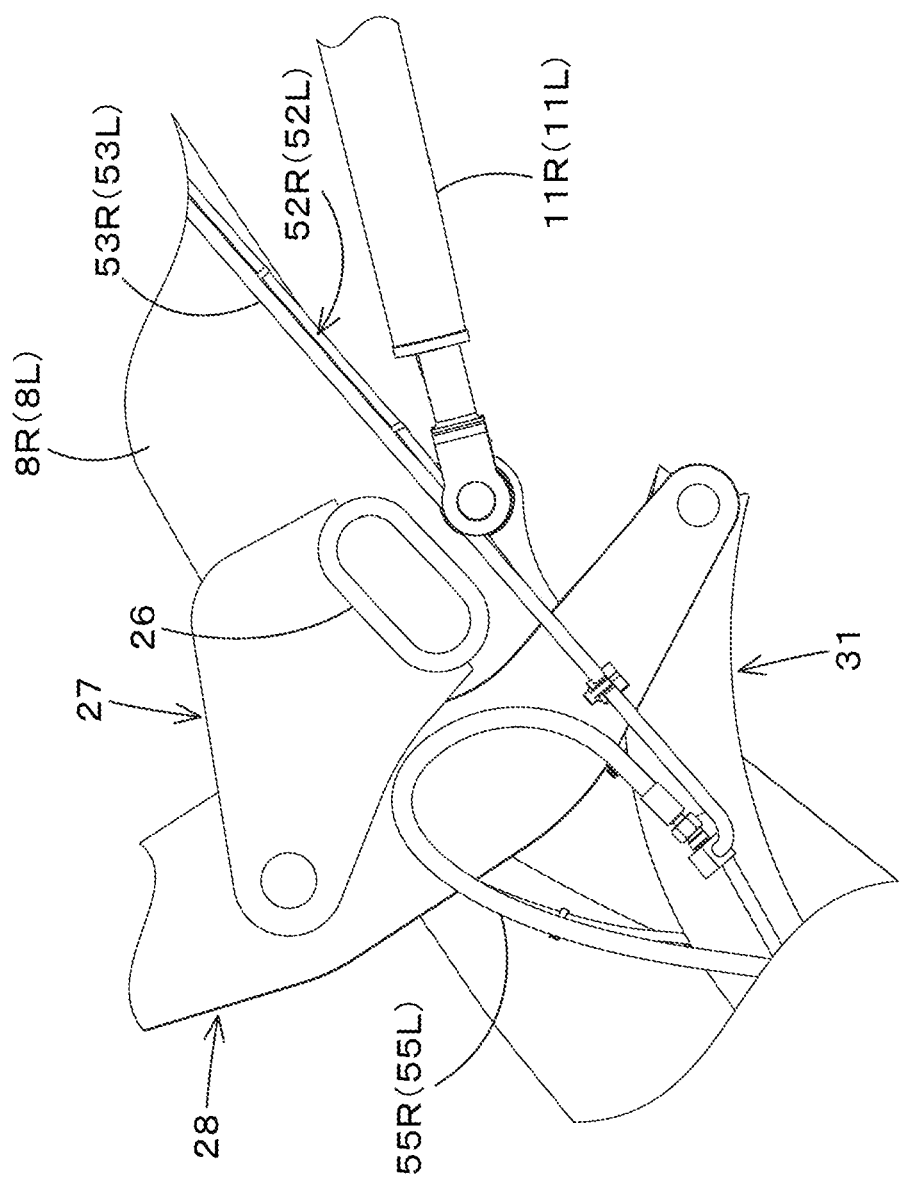
FIG. 7 is a cross section view of a side surface of a connector portion of a lift arm.

As shown in FIG. 5, the first arm 8L and the second arm 8R are connected by a connector pipe 26 provided at the midpoint of the lift arm 8 in the longitudinal direction. As shown in FIG. 7, the connector pipe 26 has an oval cross-sectional shape that is long in the longitudinal direction of the lift arm 8. In this embodiment, the cross-sectional shape of the connector pipe 26 is a kobold shape (a shape in which a portion of the circle is notched flat) with two flat surfaces connected on both sides by an arc. By making the connector pipe 26 elliptical in shape, sufficient strength can be ensured and visibility (forward visibility) can be improved when an operator seated on the operator seat 13 is looking forward.

As shown in FIG. 1, a lift cylinder 11L is provided over the midpoint of the first arm 8L in the longitudinal direction and the midpoint of the first support frame 10L in the vertical direction. A lift cylinder 11R is provided over the middle portion of the second arm 8R in the longitudinal direction and the middle portion of the second support frame 10R in the vertical direction. The lift cylinder 11L and the lift cylinder 11R are constituted of a double-acting hydraulic cylinder. By stretching and shortening the lift cylinder 11L and the lift cylinder 11R, the lift arm 8 (the first arm 8L and the second arm 8R simultaneously) is pivoted up and down.

Figure 4:
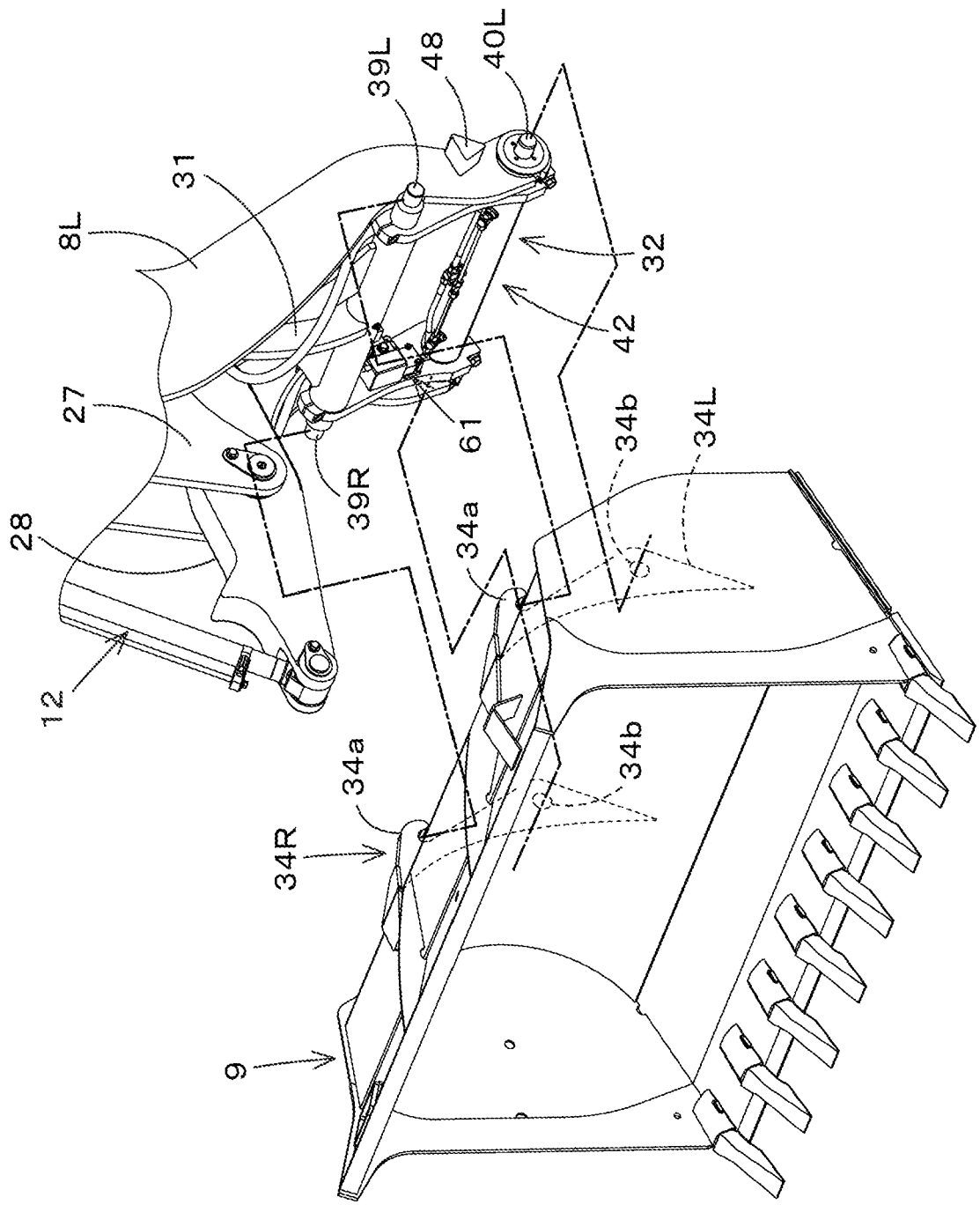
FIG. 4 is a perspective view of development of an attachment portion of a working tool.

As shown in FIG. 4, the working machine 7 has a working tool 9 that is detachably mounted to the front of the lift arm 8. The working tool 9 is fitted with a bucket as standard equipment, and instead of the bucket, working tools (attachments) such as pallet forks, mania forks, and the like, or working tools with hydraulic actuators such as sweepers, mowers, breakers, and the like (hydraulic attachments) can be attached to the working machine 1. The lower rear portion of the working tool 9 is connected and pivoted to the tip (front end side) of the lift arm 8.

As shown in FIG. 1, the working machine 1 has a working tool cylinder 12 that drives the working tool 9. The working tool cylinder 12 is constituted of a double-acting hydraulic cylinder. A bracket member 27 is fixed to the connector pipe 26, and the bracket member 27 has a pivoting link 28 at the middle portion of the rocker link 28 in the vertical direction. One end of the working tool cylinder 12 is connected to the upper portion of the rocker link 28. The other end of the working tool cylinder 12 is pivoted to a bracket member 30 on a connector member 29 connecting the first support frame 10L and the second support frame 10R. A rear portion of the interlocking link 31 is pivoted at the bottom of the pivoting link 28. The front portion of the synchronization link 31 is pivoted (engaged) to the upper rear portion of the working tool 9. By stretching and shortening the working tool cylinder 12, the pivoting link 28 pivots and the synchronization link 31 moves back and forth. This causes the working tool 9 to pivot up and down around the connection point with the lift arm 8.

Figure 3:
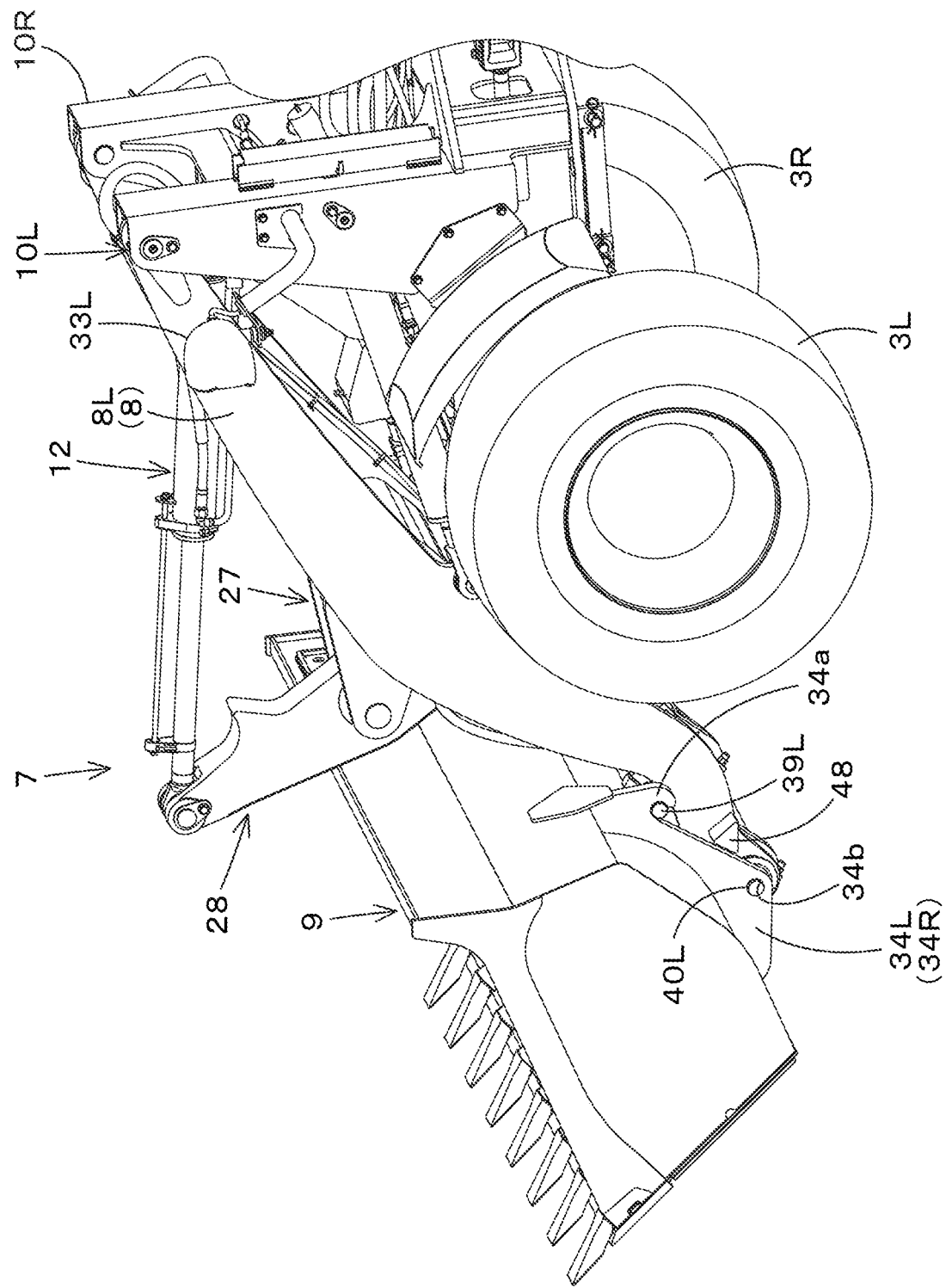
FIG. 3 is a perspective view of a front machine body and a working device.

As shown in FIG. 3 and FIG. 4, the back of the working tool (bucket) 9 is provided with a first fixing plate 34L and a second fixing plate 34R spaced in the machine width direction K2. The first fixing plate 34L and the second fixing plate 34R extend in the vertical direction. The first fixing plate 34L and the second fixing plate 34R have a hook portion 34a at the top and an insertion hole 34b at the bottom.

The front wheel 3L is provided forward of the first support frame 10L and to the left of the first arm 8L. The front wheel 3L is located behind the left portion of the working tool 9. The front wheel 3R is provided forward of the second support frame 10R and to the right of the second arm 8R. The front wheel 3R is located behind the right portion of the working tool 9.

As shown in FIG. 5, the front machine body 2A is provided with a control valve V1. The control valve V1 is a hydraulic device including an aggregate of control valves that control hydraulic actuators such as a hydraulic cylinder and a hydraulic motor equipped on the working machine 1. The control valves including the control valve V1 are, for example, a lift control valve that controls the lift cylinder 11, a working tool control valve that controls the working tool cylinder 12, and a auxiliary control valve 38 that controls the hydraulic actuator provided with the working tool 9. The auxiliary control valve 38 is, in detail, a control valve that controls the hydraulic actuator when the working tool 9 provided with the hydraulic actuator is mounted.

Figure 6:
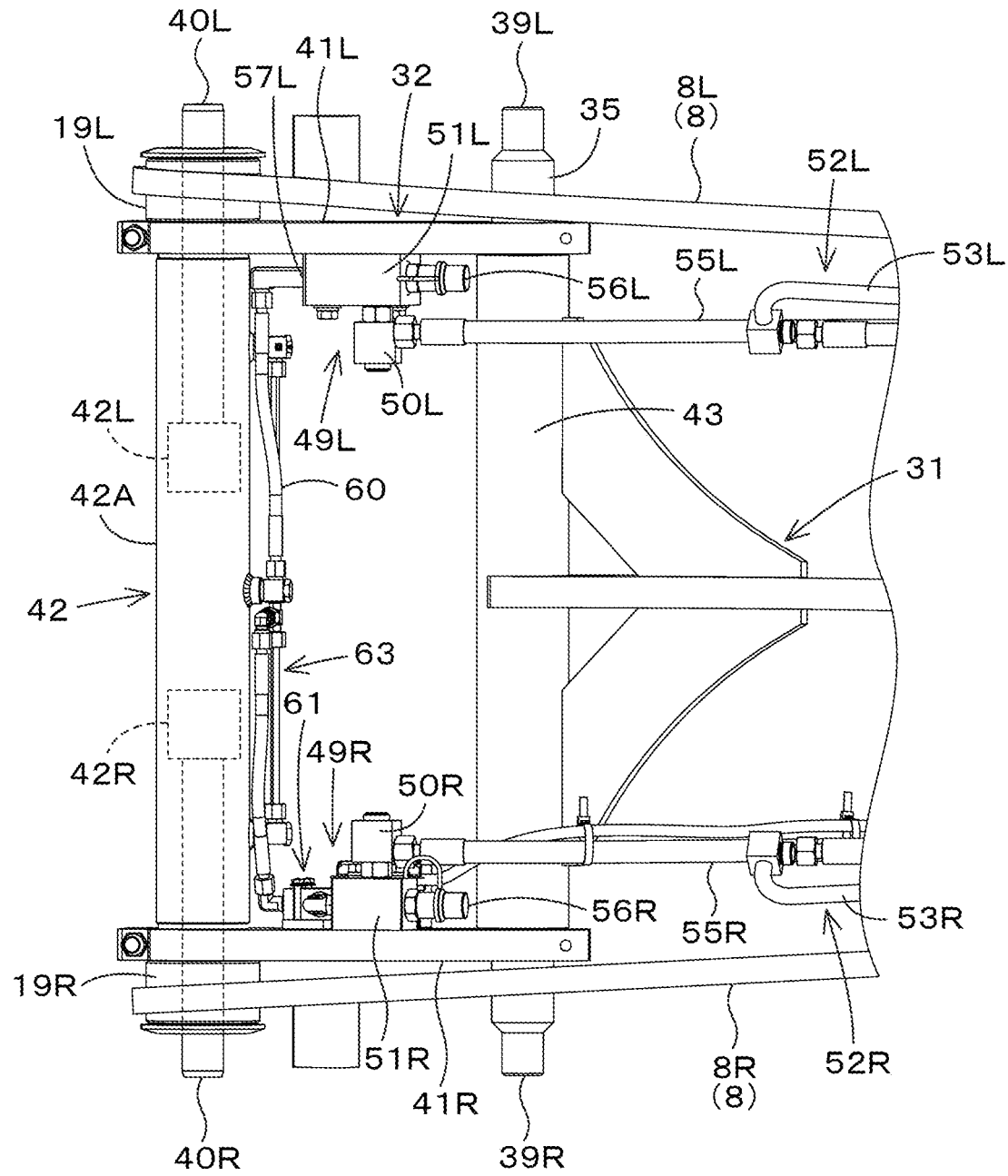
FIG. 6 is a view of a quick coupler seen from below.

As shown in FIG. 5 and FIG. 6, the working device 7 has a quick coupler 32 for attaching and detaching the working tool 9 to the lift arm 8. The quick coupler 32 has a first engagement pin (first engagement portion) 39L, a second engagement pin (second engagement portion) 39R, a first pin (connector pin) 40L, a second pin (connector pin) 40R, a coupler cylinder 42, a first plate 41L and a second plate 41R.

A first engagement pin 39L is provided on the left side of the front portion of the synchronization link 31, and a second engagement pin 39R is provided on the right side of the front portion of the synchronization link 31. In detail, a support cylinder 43 extending in the front of the synchronization link 31 is provided in the front of the synchronization link 31, and a rod member 35 is inserted and fixed in this support cylinder 43. A first engagement pin 39L is integrally formed at the left end of this rod member 35. The first engagement pin 39L is formed smaller in diameter than the rod member 35 and can be engaged with the hook portion 34a of the first fixing plate 34L from below. The second engagement pin 39R is integrally formed on the right end of the rod member 35. The second engagement pin 39R is formed smaller in diameter than the rod member 35 and is capable of engaging the hook portion 34a of the second fixing plate 34R from below to the hook portion 34a of the second fixing plate 34R.

The first pin 40L is movable in the front (tip side) of the first arm 8L to a bearing boss 19L in the front (tip side) of the first arm 8L in the machine width direction K2. The first pin 40L can be inserted into the insertion hole 34B of the first fixing plate 34L. The working tool 9 and the first arm 8L are connected to the working tool 9 and the first arm 8L by the insertion of the first pin 40L into the insertion hole 34b.

As shown in FIG. 6, the second pin 40R is movably provided in the bearing boss 19R on the front (tip side) of the second arm 8R in the machine width direction K2. The second pin 40R can be inserted into the insertion hole 34B of the second fixing plate 34R. The working tool 9 and the second arm 8R are connected by the insertion of the second pin 40R into the insertion hole 34B.

The coupler cylinder 42 is a device that drives the first pin 40L and the second pin 40R. The coupler cylinder 42 has a cylinder tube 42A. The cylinder tube 42A is arranged between the front portions of the first and second arms 8L and 8R (between the bearing boss 19L and the bearing boss 19R) extending in the machine width direction K2.

A first pin 40L is movable (movable in and out) in the machine width direction K2 at one end (left end side) of the cylinder tube 42A. In detail, the first pin 40L is movable in the direction of protruding from the cylinder tube 42A (left side) and in the direction of receding into the cylinder tube 42A (right side). A first piston 42L is provided on the left side within the cylinder tube 42A, to which the first pin 40L is connected. The first pin 40L is driven by the first piston 42L. Thus, the first pin 40L includes a rod of the coupler cylinder 42. The rod of the coupler cylinder 42 and the first pin 40L may be separate from the first pin 40L.

As shown in FIG. 6, a second pin 40R is movable (movable out and back) on the other end (right side) of the cylinder tube 42A in the direction of the machine body width K2. In detail, the second pin 40R is movable in the direction of protruding from the cylinder tube 42A (to the right) and in the direction of receding into the cylinder tube 42A (to the left). A second piston 42R is provided on the right side within the cylinder tube 42A, to which the second pin 40R is connected. The second pin 40R is driven by the second piston 42R. Thus, the second pin 40R includes a rod of the coupler cylinder 42. The rod of the coupler cylinder 42 and the second pin 40R may be separate from the rod of the coupler cylinder 42.

As described above, the coupler cylinder 42 is formed of a double-rod type hydraulic cylinder in which a pair of rods can move in and out of the cylinder tube 42A simultaneously.

As shown in FIG. 6, the first plate 41L connects the first engagement pin 39L side to the first pin 40L side. In detail, the upper portion of the first plate 41L is attached to the left portion of the rod member 35. The lower portion of the first plate 41L is attached to the left portion of the cylinder tube 42A. The first plate 41L connects the first engagement pin 39L to the first pin 40L via the rod member 35 and the cylinder tube 42A.

The second plate 41R connects the second engagement pin 39R side to the second pin 40R side. In detail, the upper portion of the second plate 41R is attached to the right portion of the rod member 35. The lower portion of the second plate 41R is attached to the right portion of the cylinder tube 42A. The second plate 41R connects the second engagement pin 39R to the second pin 40R via the rod member 35 and the cylinder tube 42A.

To attach the working tool 9 to the quick coupler 32, firstly the first engagement pin 39L is engaged with the hook portion 34a of the first fixing plate 34L from below and then the second engagement pin 39R is engaged with the hook portion 34a of the second fixing plate 34R from below. When the lift arm 8 is moved upward from this state, the working tool 9 is lifted up, and the lower side of the working tool 9 moves backward around the first engagement pin 39L and the second engagement pin 39R. The working tool 9 is positioned by coming into contact with the stopper member 48 provided on the lift arm 8. When the first pin 40L and the second pin 40R are moved in the protruding direction in this state, the first pin 40L is inserted into the insertion hole 34b of the first fixed plate 34L and the second pin 40R is inserted into the insertion hole 34b of the second fixed plate 34R. This causes the working tool 9 to be attached to the quick coupler 32 (the lift arm 8).

Figure 8:
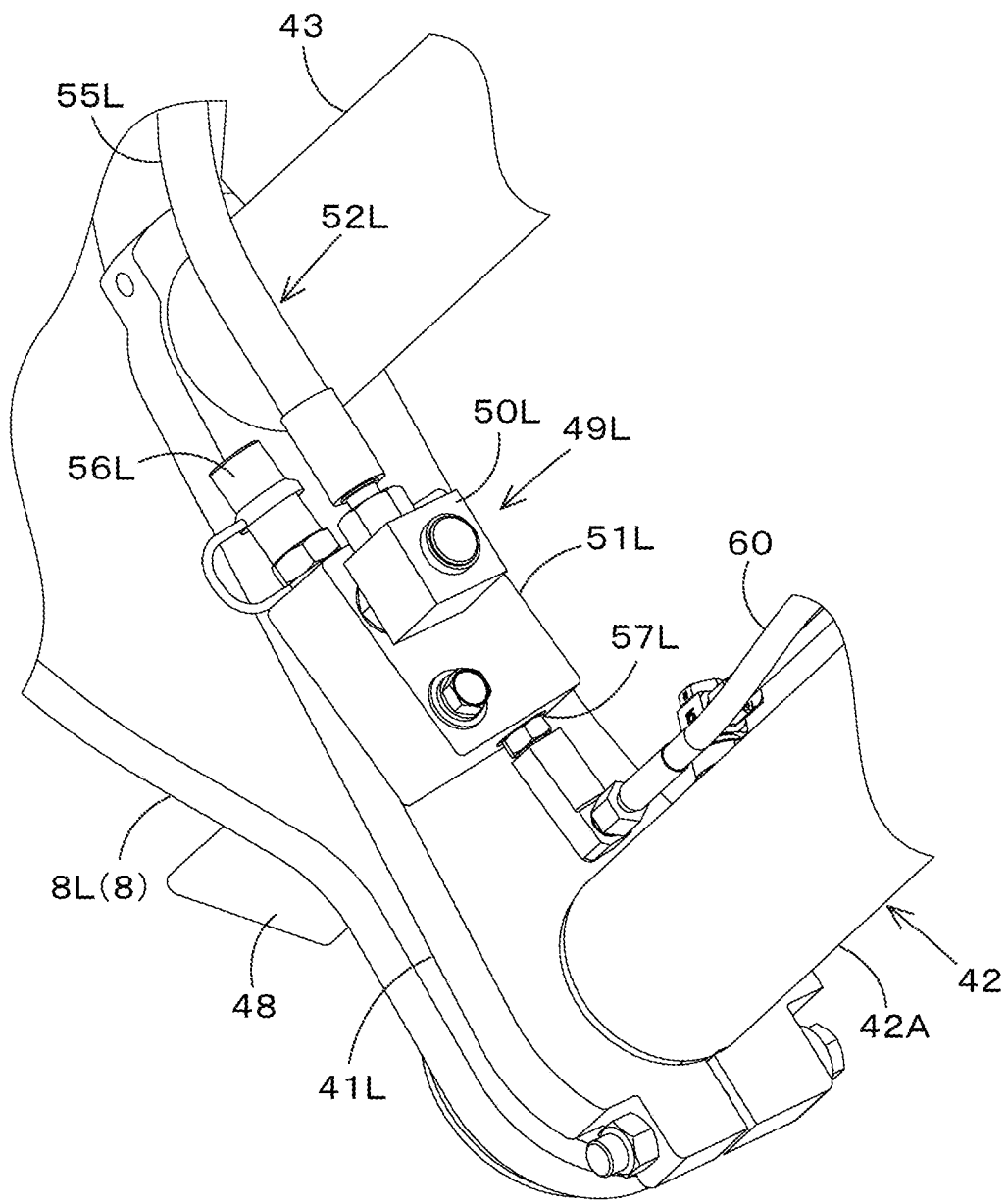
FIG. 8 is a perspective view of a left inner side of a quick coupler seen from a back surface side.

As shown in FIG. 8, a first connector member 49L is mounted on the inside of the lower portion of the first plate 41L (on the inner side of the machine body). The first connector member 49L has a first input member 50L and a first output member 51L. A first hydraulic pipeline 52L is connected to the first connector member 49L. As shown in FIG. 5, the first hydraulic pipeline 52L is arranged along the first arm 8L from the auxiliary control valve 38 (control valve V1) to the front of the first arm 8L. The first hydraulic pipeline 52L has a first piping 53L, a second piping 54L and a third piping 55L. The first piping 53L is attached to the inner side of the first arm 8L (on the inner side of the machine body). The first piping 53L is formed by a steel pipe and is arranged to pass through the underside of the connector pipe 26 (see FIG. 7). This allows for good forward visibility for an operator seated on the operator seat 13. The second piping 54L connects the auxiliary control valve 38 to the first piping 53L. As shown in FIG. 6, the third piping 55L connects the first piping 53L to the first input member SOL. The second piping 54L and the third piping 55L include a hydraulic hose. The first hydraulic pipeline 52L includes a hydraulic coupler and other components necessary for connecting the pipes.

As shown in FIG. 8, the first output member 51L has a first take-out portion 56L capable of taking out hydraulic fluid. The first take-out portion 56L is connected to a hydraulic actuator mounted on the working tool 9 via a hydraulic hose or the like. The first output member 51L has a first output portion 57L. The first output portion 57L is capable of outputting the hydraulic fluid. As shown in FIG. 6, the first output portion 57L is connected to the head side of the first piston 42L and the second piston 42R in the coupler cylinder 42 via the connector member 60. The head side is the opposite side from the side to which the first pin 40L and the second pin 40R are connected. In the case of this embodiment, it is the center side of the cylinder tube 42A (between the first pin 40L and the second pin 40R). Thus, the hydraulic fluid from the first hydraulic pipeline 52L is supplied from the first hydraulic pipeline 52L to the head side of the coupler cylinder 42 via the first output portion 57L to the connector member 60, so that the first piston 42L and the second piston 42R can move outwardly out of the machine body to cause the first pin 40L and the second pin 40R to be inserted into the insertion hole 34b. When the first pin 40L and the second pin 40R are retracted, the hydraulic fluid is able to escape from between the first piston 42L and the second piston 42R in the cylinder tube 42A through the connector member 60 and the first output portion 57L.

Figure 9:
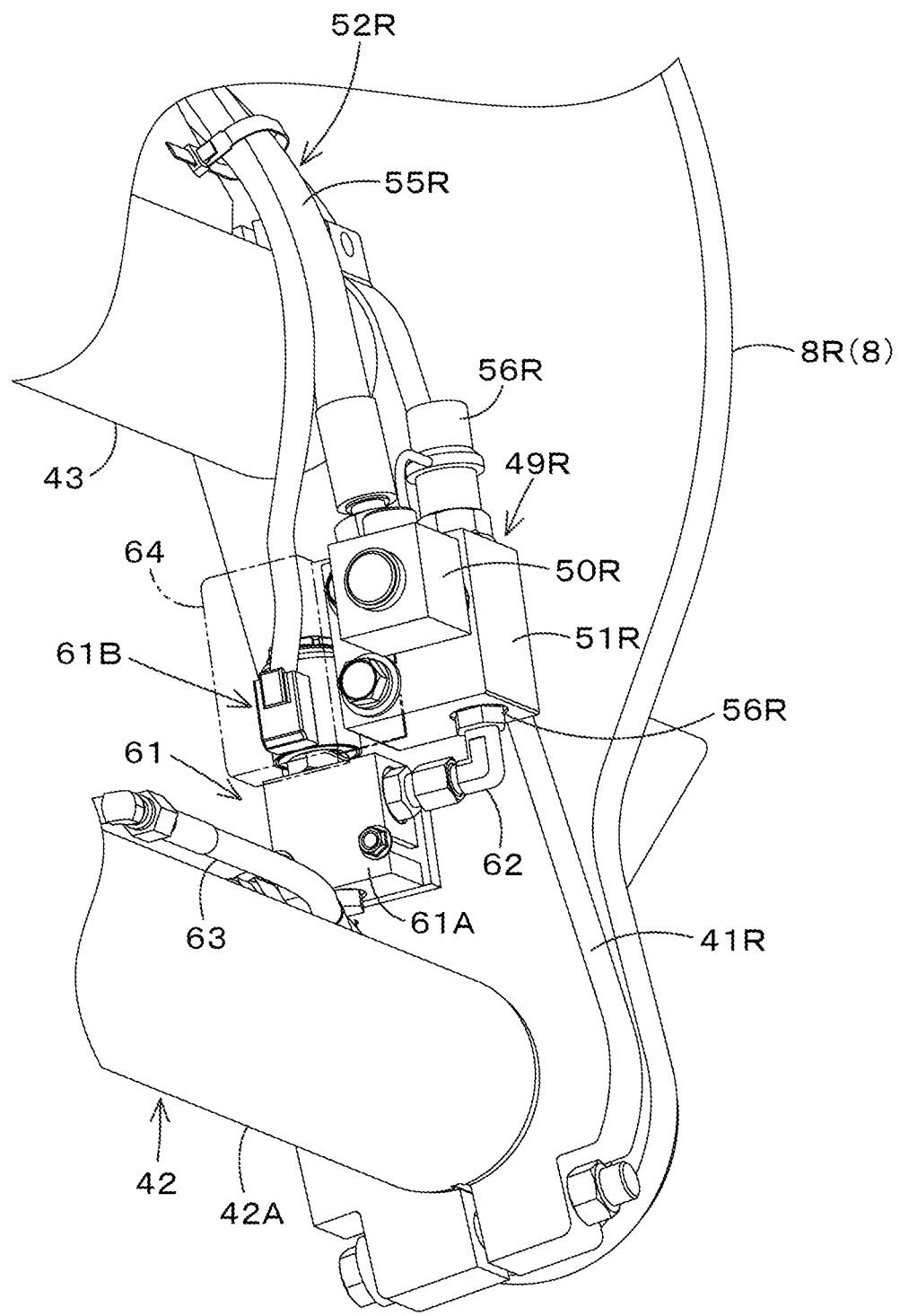
FIG. 9 is a perspective view of a right inner side of a quick coupler seen from a back surface side.

As shown in FIG. 9, a second connector member 49R is mounted on the inside of the lower portion of the second plate 41R (on the inner side of the machine body). The second connector member 49R has a second input member 50R and a second output member 51R. A second hydraulic pipeline 52R is connected to the second connector member 49R. As shown in FIG. 5, the second hydraulic pipeline 52R is arranged along the second arm 8R from the auxiliary control valve 38 (control valve V1) to the front of the second arm 8R. The second hydraulic pipeline 52R has a fourth piping 53R, a fifth piping 54R and a sixth piping 55R. The fourth piping 53R is attached to the inside of the second arm 8R (on the inner side of the machine body). The fourth pipe 53R is formed by a steel pipe and is arranged to pass through the underside of the connector pipe 26 (see FIG. 7). This allows for good forward visibility for an operator seated on the operator seat 13. A fifth pipe 54R connects the auxiliary control valve 38 to the fourth pipe 53R. As shown in FIG. 6, the sixth piping 55R connects the fourth piping 53R to the second input member 50R. The fifth piping 54R and the sixth piping 55R include a hydraulic hose. The second hydraulic pipeline 52R also includes a hydraulic coupler and other components necessary for connecting the pipes.

The second output member 51R has a second take-out portion 56R capable of taking out the hydraulic fluid. The second take-out portion 56R is connected to a hydraulic actuator mounted on the working tool 9 via a hydraulic hose or the like. The second output member 51R has a second output portion 57R. The second output portion 57R is capable of outputting the hydraulic fluid to the lock release valve 61.

The lock release valve 61 is mounted inside the lower portion of the second plate 41R. The lock release valve 61 is provided in the vicinity of the second output member 51R. The lock release valve 61 includes a solenoid valve (solenoid valve) and has a main body valve 61A that operates the coupler cylinder 42 (to supply and discharge hydraulic fluid) and a solenoid portion 61B that controls the main body valve 61A.

The main body valve 61A is connected to the second output portion 57R of the second output member 51R via a connector member 62. The body valve 61A is connected to the rod side of the first piston 42L and the second piston 42R in the coupler cylinder 42 via a connector member 63. The rod side is the side to which the first pin 40L and the second pin 40R are connected. In this embodiment, it is the one end side and the other end side of the cylinder tube 42A. When hydraulic fluid from the second hydraulic pipeline 52R is supplied from the main body valve 61A to the rod side of the coupler cylinder 42 via the connector member 63, the first piston 42L and the second piston 42R move inwardly into the machine body and the first pin 40L and the second pin 40R are withdrawn from the insertion hole 34B. As a result, the connection between the lift arm 8 and the working tool 9 by the first pin 40L and the second pin 40R is released. When the first pin 40L and the second pin 40R are protruded, the hydraulic fluid is allowed to escape from the rod side of the cylinder tube 42A through the connector member 63, the main body valve 61A and the second output portion 57R. The lock release valve 61 is operated, for example, by a switch in the grip of the operation lever 16.

The solenoid portion 61B is covered by the cover member 64. The cover member 64 is attached to the second plate 41R.

The lock release valve 61 may be attached to the second plate 41R.

Figure 10:
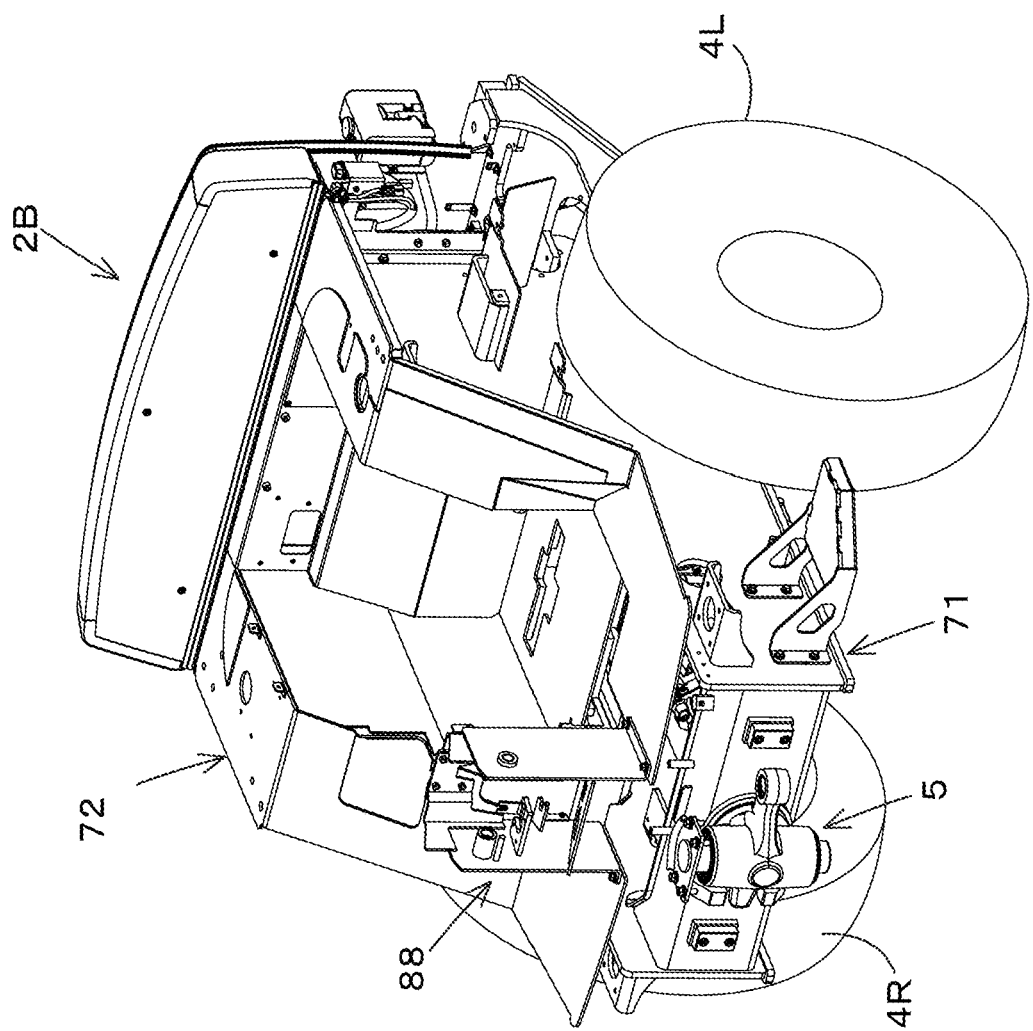
FIG. 10 is a perspective view of a rear machine body.

As shown in FIG. 10, the rear machine body 2B has a machine body frame 71 and a floor frame 72 mounted on the machine body frame 71. The machine body frame 71 is supported for travel by the rear wheels 4L and 4R. A machine connector member 5 is attached to the front of the machine body frame 71.

Figure 11:
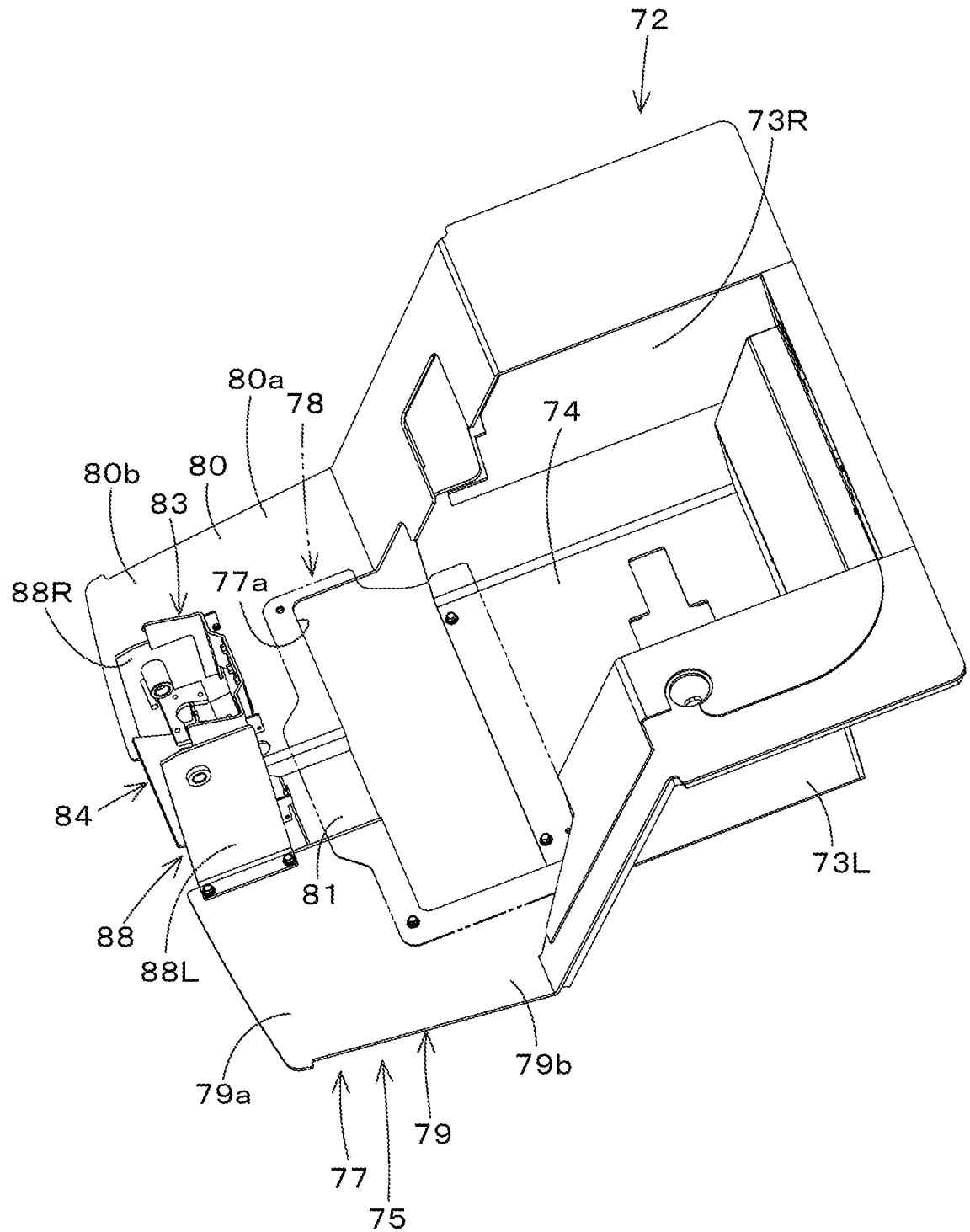
FIG. 11 is a perspective view of a floor frame seen obliquely from left above.
Figure 12:
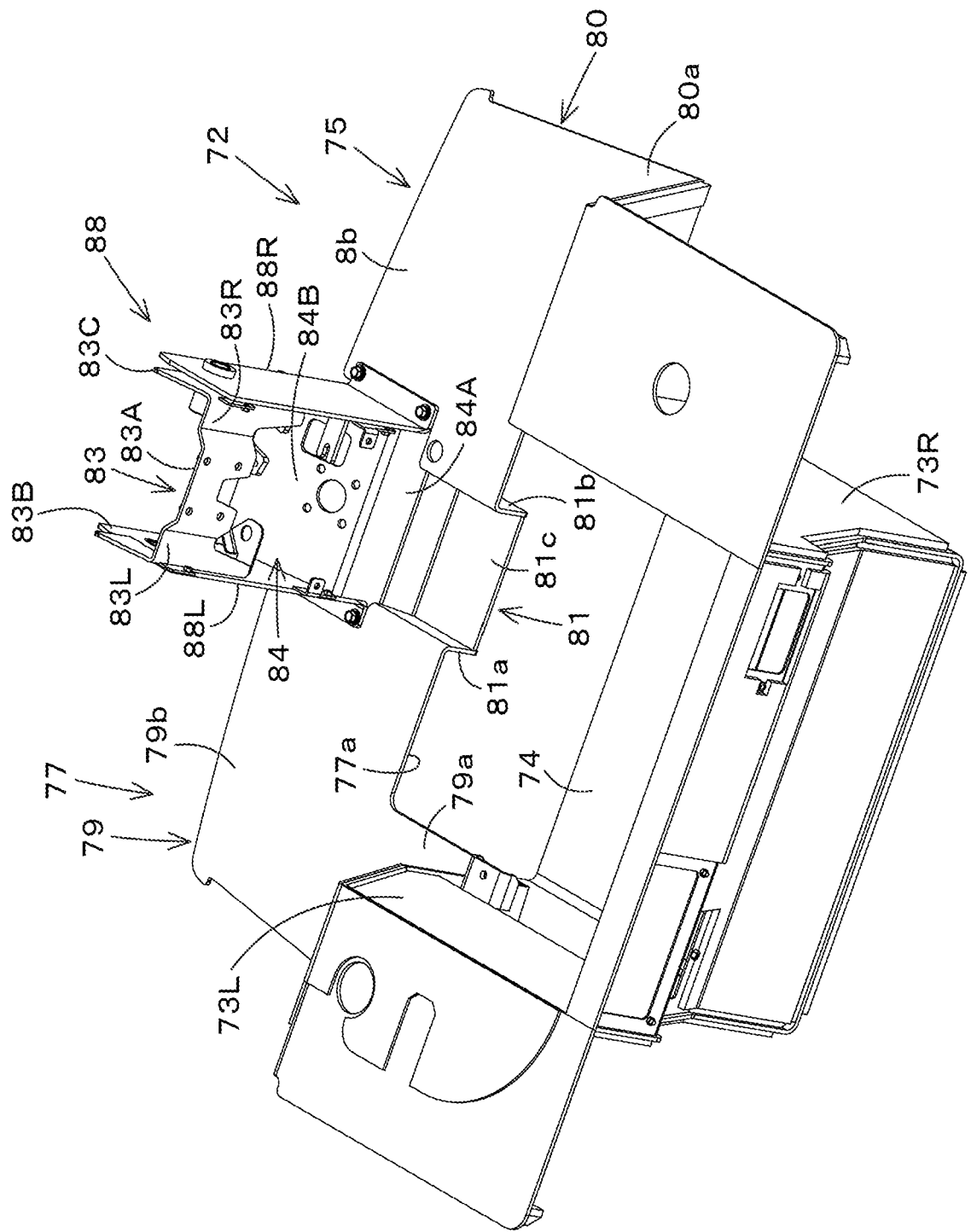
FIG. 12 is a perspective view of a floor frame seen from a back surface side.

As shown in FIG. 11 and FIG. 12, the floor frame 72 is mounted on the machine body frame 71 via a mounting member having an elastic material, and is supported on the machine body frame 71 for vibration isolation. The floor frame 72 has a left side wall 73L and a right side wall 73R. A bottom wall (installation portion) 74 is provided between the lower portion of the side wall 73L and the side wall 73R.

The floor frame 72 has a floor portion (step) 75 provided on the forward side of the bottom wall 74. The bottom wall 74 is located below the floor portion 75. Thus, there is a gap between the front end side of the bottom wall 74 and the rear end of the floor portion 75. In detail, a gap is provided between the front end side of the bottom wall 74 and the openable cover 78 described below, through which a duct member for distributing conditioned air passes.

The floor portion 75 has a floor body 77 having an inspection opening 77a and an openable cover 78 that blocks the inspection opening 77a. The floor body 77 has a first portion 79, a second portion 80 and a third portion 81.

The first portion 79 includes a left portion of the floor body 77. The rear portion 79a of the first portion 79 is formed narrower in width in the machine width direction K2 than the front portion 79b. In detail, the rear portion 79a is located outwardly (left side) of the machine body from the side wall 73L, and the front portion 79b has a portion extending forward from the rear portion 79a and a portion extending inwardly (right side) of the machine body from that portion from the rear portion 79a.

The second portion 80 includes the right portion of the floor body 77. The rear portion 80a of the second portion 80 is narrower in width in the machine width direction K2 than the front portion 80b. In detail, the rear portion 80a is located outward (right side) of the machine body from the side wall 73R, and the front portion 80b has a portion extending forward from the rear portion 80a and a portion extending inward (left side) of the machine body from the front portion 80a.

The third portion 81 is located in the center of the machine width direction K2 and is also located between the front portion 79b of the first portion 79 and the front portion 80b of the second portion 80. The third portion 81 connects the front portion 79b and the front portion 80b. In detail, the third portion 81 connects the rear sides of the front portion 79b and the front portion 80b to each other.

There is an opening between the rear portion 79a of the first portion 79 and the rear portion 80a of the second portion 80. This opening is the inspection opening 77a. Through the inspection opening 77a, equipment and other items deployed in the machine body 71 can be inspected through the inspection opening 77a.

As shown in FIG. 12, the third portion 81 is formed in a recess that is recessed downwardly. In detail, the third portion 81 has a side wall portion 81a extending downwardly from the front right end of the first portion 79, a side wall portion 81b extending downwardly from the front left end of the second portion 80, and a lower wall portion 81c connecting the lower ends of the side wall portion 81a and the side wall portion 81b.

Figure 13:
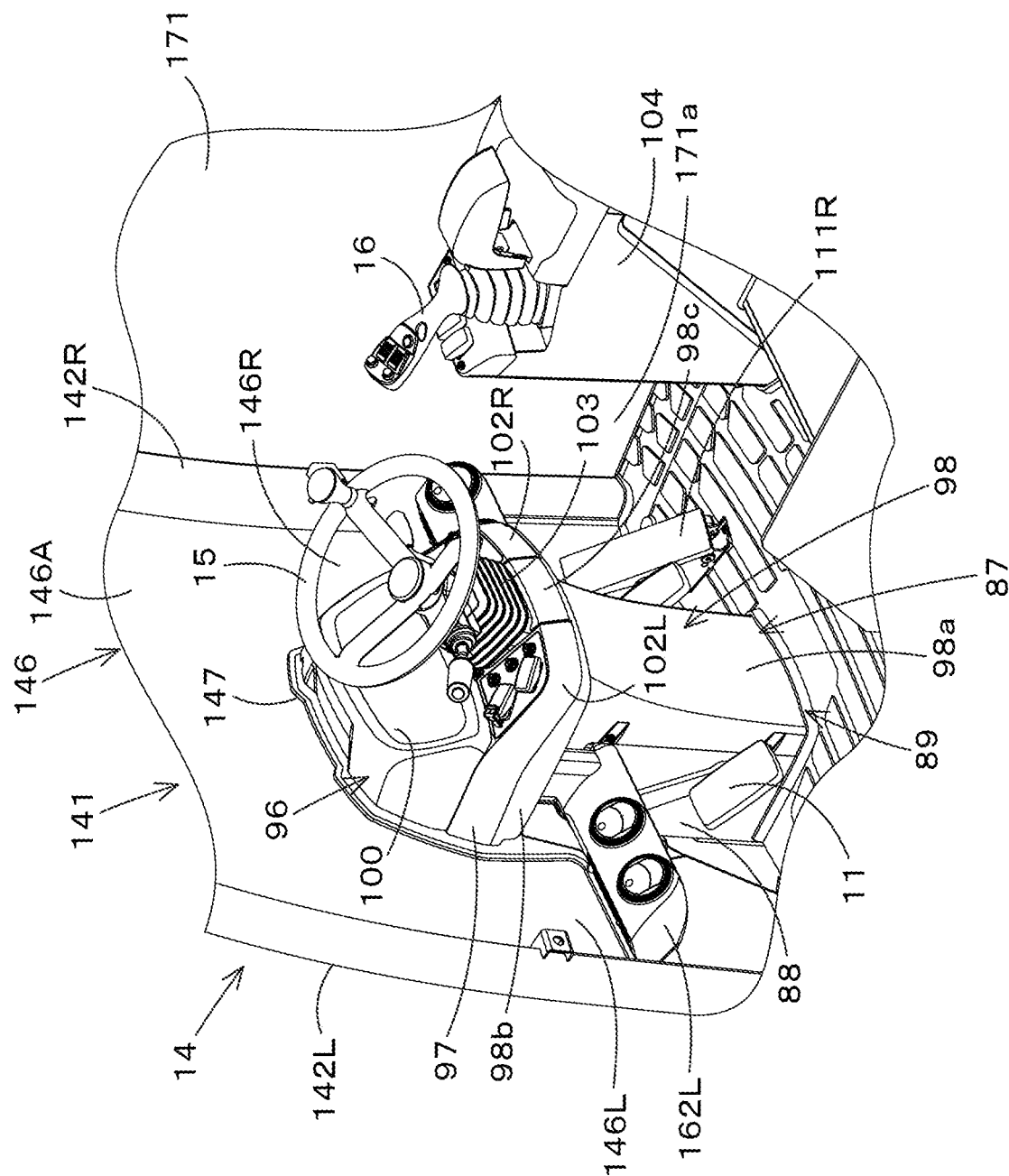
FIG. 13 is a perspective view of a front portion of a cabin interior.
Figure 14:
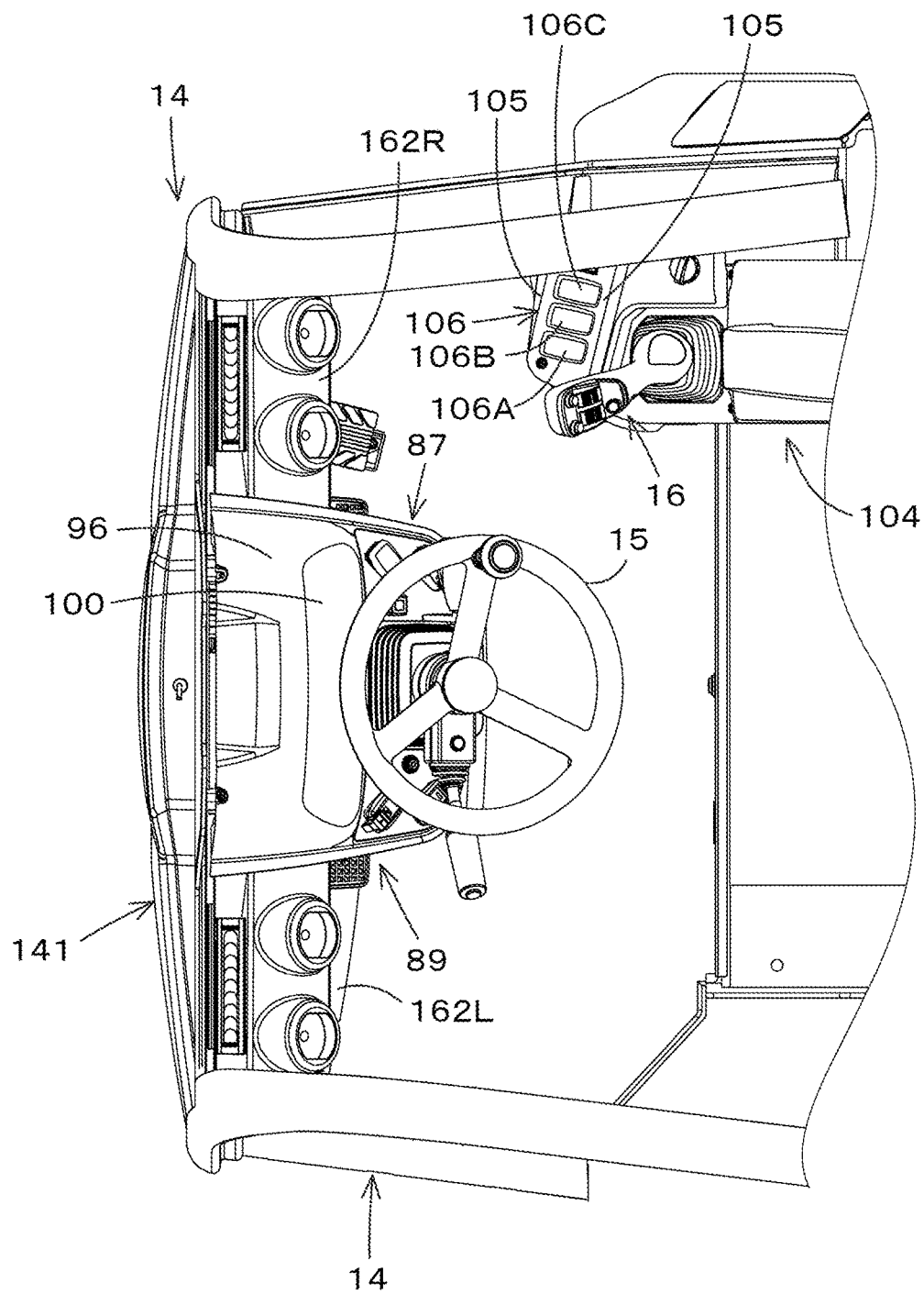
FIG. 14 is a plan view of a front portion of a cabin interior.

As shown in FIG. 13 and FIG. 14, a steering column 87 is provided at the front of the cabin compartment to support the steering 15. The steering column 87 is located in the center of the cabin chamber in the machine width direction K2.

As shown in FIG. 13, the steering column 87 has a column frame (frame member) 88 erected at the front of the floor frame 72 and a column cover 89 covering the column frame 88.

As shown in FIG. 11 and FIG. 12, the column frame 88 is provided at the center of the front portion of the floor frame 72 in the machine width direction K2. The column frame 88 is located forward of the third portion 81. The column frame 88 has a first side wall 88L and a second side wall 88R spaced apart in the machine width direction K2. The first side wall 88L constitutes the left portion of the column frame 88 and is erected on the floor 75. In detail, the first side wall 88L is fixed on the right side of the front portion 79b of the first portion 79 and on the forward side of the third portion 81. The second side wall 88R includes the right portion of the column frame 88 and is erected on the floor portion 75. In detail, it is fixed on the left end side of the front portion 80B of the second portion 80 and on the forward side of the third portion 81.

The column frame 88 has a first connector member 83 and a second connector member 84. The first connector member 83 connects the upper portions of the rear portions of the first side wall 88L and the second side wall 88R to each other. The first connector member 83 has a attachment wall portion 83A in the center of the machine width direction K2. The first connector member 83 has one side wall 83L located to the left of the attachment wall portion 83A and the other side wall 83R located to the right. The one side wall portion 83L and the other side wall portion 83R are located forward of the attachment wall portion 83A. The attachment wall portion 83A and the one side wall portion 83L and the other side wall portion 83R are connected to each other. The first connector member 83 has a fixed wall 83B protruding forward from a left end of the one side wall portion 83L and fixed wall 83C protruding forward from a right end of the other side wall 83R and fixed to the second side wall 88R.

The second connector member 84 connects the lower portions of the first side wall 88L and the second side wall 88R to each other. In detail, the second connector member 84 has a rear wall 84A rising from the front of the lower wall portion 81C of the third portion 81, and an inclined upper wall 84B transitioning upwardly from the upper end of the rear wall 84A toward the front.

Figure 15:
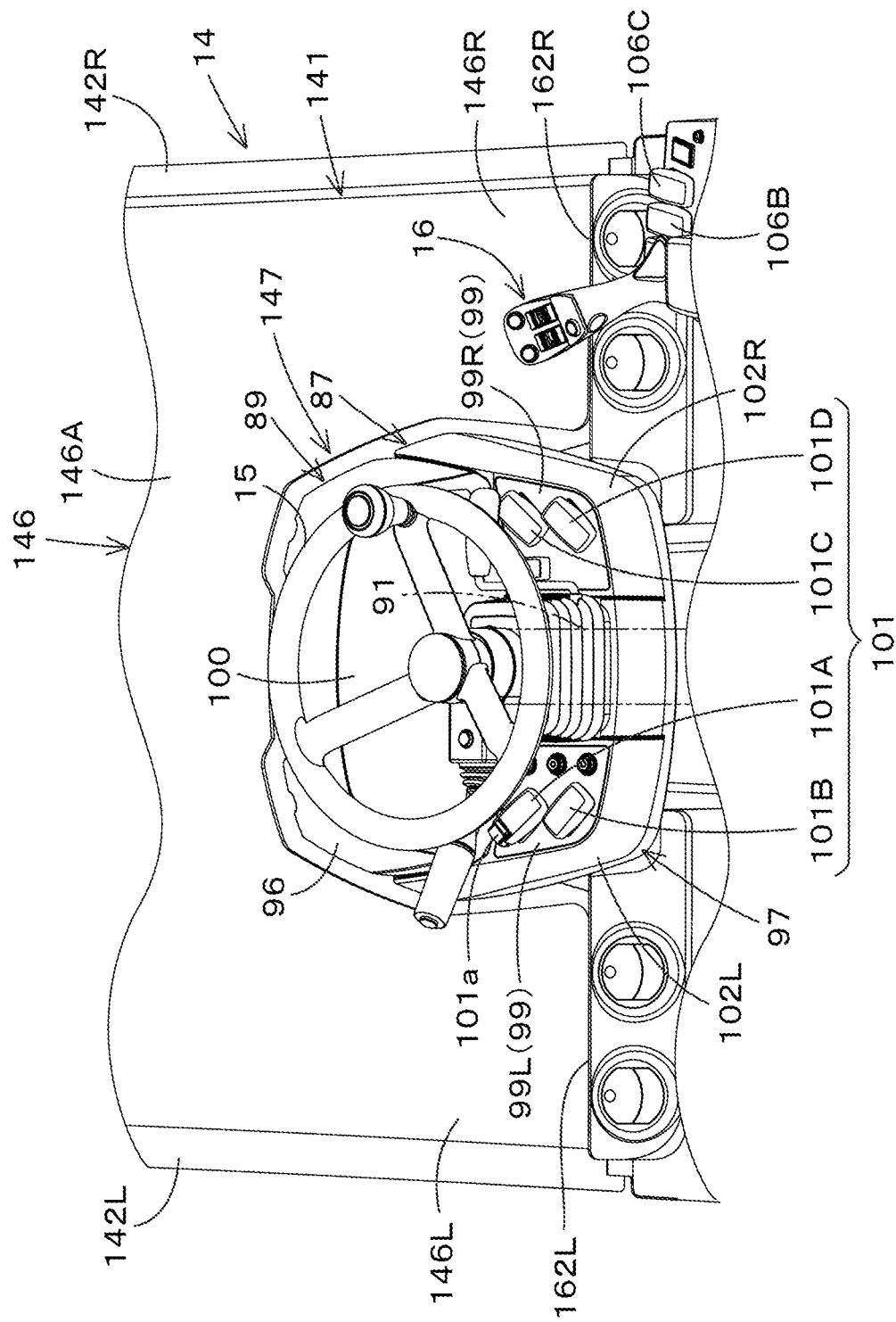
FIG. 15 is a back view of a front portion of a cabin interior.

As shown in FIG. 15, the column cover 89 (steering column 87) has a switch panel 99 arranged below the steering wheel 15 on the top side. The switch panel 99 has a first group of switches 101 including a plurality of switches (first switch 101A to fourth switch 101D) arranged on both sides of the machine width direction K2 of the steering post 91 supporting the steering 15 and inclined to transition outwardly out of the machine body in plan view.

As shown in FIG. 13, the column cover 89 has a first cover member 96, a second cover member 97 and a third cover member 98. The first cover member 96 includes an upper portion of the column cover 89. A monitor 100 is provided on a back side of the first cover member 96. The front side of the first cover member 96 is open.

The second cover member 97 is provided on the lower side of the first cover member 96. The first and second cover members 96 and the second cover members 97 are located above the column frame 88 and extend left and right from the column frame 88. The front side of the second cover member 97 is also open.

As shown in FIG. 15, the second cover member 97 has a first panel retainer portion 102L extending rearwardly from the first cover member 96 in the left portion. The second cover member 97 has a second panel retainer portion 102R extended rearwardly from the first cover member 96 in the right portion. A steering post 91 passes between the first panel retainer portion 102L and the second panel retainer portion 102R.

The switch panel 99 includes a first switch panel 99L in the first panel holding portion 102L and a second switch panel 99R in the second panel holding portion 102R.

As shown in FIG. 13, the third cover member 98 has a first portion 98a, a second portion 98b, and a third portion 98c. The first portion 98a covers the rear side of the column frame 88. The second portion 98b covers the lower side of the second cover member 97. In detail, the second portion 98b covers the lower side of the left portion and the lower side of the right portion and the lower side of the front portion of the second cover member 97. The third portion 98c is located between the first panel retainer portion 102L and the second panel retainer portion 102R and covers between the panel retainer portions 102L and 102R. A boot member 103 covering the steering post 91 is provided in the third portion 98c.

The front side of the steering column 87 is open. As shown in FIG. 13 and FIG. 14, the steering column 87 is positioned in close proximity to the front panel 141 of the cabin 14, and the front side of the steering column 87 is covered by the front panel 141.

As shown in FIG. 13 and FIG. 15, the front panel 141 is located between a first front pillar 142L on the left side of the front of the cabin 14 and a second front pillar 142R on the right side of the front of the cabin 14. The front panel 141 has a transparent front window 146 that allows for forward visibility. The front window 146 includes an upper to mid portion of the front panel 141. The front window 146 has a main portion 146A, a first lower portion 146L, and a second lower portion 146R. The main portion 146A is located from the first front pillar 142L to the second front pillar 142R on the side above the steering column 87. The first lower position 146L extends downwardly from a left side of the main portion 146A and is located on one side of the upper portion of the steering column 87. The second lower position 146R extends downwardly from the right side of the main portion 146A and is located on the other side of the upper portion of the steering column 87. Between the first lower position 146L and the second lower position 146R is a cover panel portion 147 having no transparency. The front side of the upper portion of the steering column 87 is covered by the cover panel portion 147.

The front wheel 3L and the first pin 40L can be seen from inside the cabin through the first lower position 146L. The status of the front wheels 3R and the second pin 40R is visible from inside the cabin chamber through the second lower position 146R.

As shown in FIG. 15, the first group of switches 101 includes a first switch 101A and a second switch 101B arranged back and forth on the left (one side) of the steering post 91, and a third switch 101C and a fourth switch arranged back and forth on the right (other side) of the steering post 91. The first switch 101A and the second switch 101B are inclined to transition to the left as they move forward. The third switch 101C and the fourth switch 101D are in an inclined shape that migrates to the right as it moves forward.

The first switch 101A and the second switch 101B are provided on the first switch panel 99L, and the third switch 101C and the fourth switch 101D are provided on the second switch panel 99R. The first switch 101A to the fourth switch 101D are seesaw switches that are operated by pressing one end and the other end in the inclination direction.

The first switch 101A is a release switch for unlocking the working tool 9. In detail, the first switch 101A is a double action switch with a guard, and when the knob 101a is operated (for example, when the knob 101a is pressed down), the front portion of the first switch 101A can be pressed, and when the front portion is pressed, the lock release valve 61 can be operated. Accordingly, the operation of the lock release valve 61 cannot be performed unless the first switch 101A is operated (the operation of the lock release valve 61 is disabled). When the first switch 101A is operated, the lock release valve 61 can be operated (the operation of the lock release valve 61 is enabled). That is, the operator's intended operation allows for the uncoupling of the lift arm 8 and the working tool 9 to be performed by the operator's intended operation.

The second switch 101B is a regenerative switch that activates an exhaust gas purification system that purifies the exhaust gas. The exhaust gas purification system is, for example, a DPF (Diesel Particulate Filter).

The third switch 101C is a light switch that turns on or off the work lights 33L and 33R.

The fourth switch 101D is a parking switch that regulates movement during parking. In detail, it is a switch that activates or deactivates a parking brake device that regulates the movement of the working machine 1 while parked.

As shown in FIG. 13, a console 104 is provided on the side of the operator seat 13 in the cabin interior. The console 104 is mounted on the floor frame 72. The operation lever 16 is provided at the front of the console 104.

Figure 16:
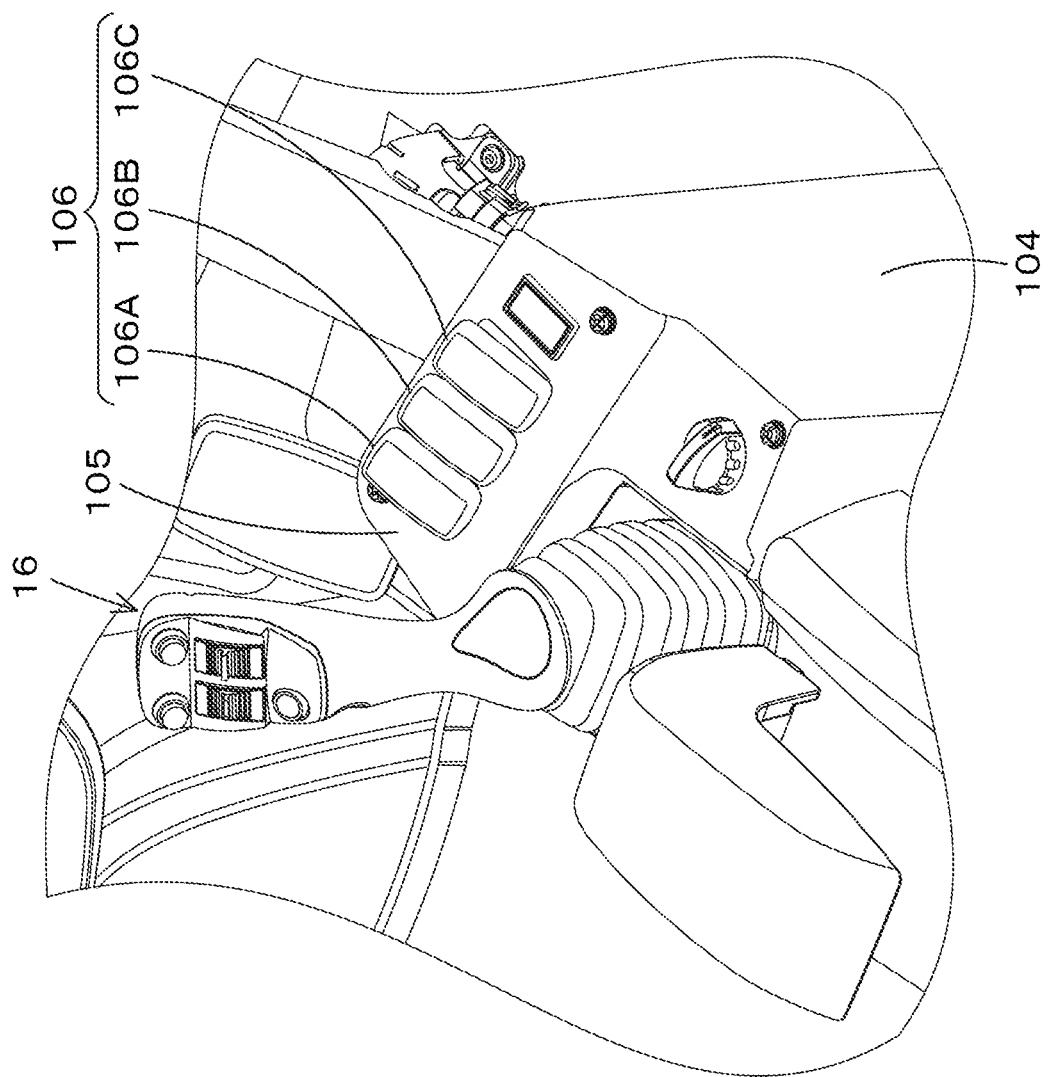
FIG. 16 is a perspective view of a back surface of a front portion of a console.

As shown in FIG. 14 and FIG. 16, the console 104 has a switch installation portion 105 provided forward and below the operation lever 16. The switch installation portion 105 has a second group of switches 106 including a plurality of switches (fifth switch 106A to seventh switch 106C) arranged in the machine width direction K2. The fifth switch 106A to the seventh switch 106C are seesaw switches that are pivoted back and forth. 0 The second switch group 106 is an operation switch for the working system.

The fifth switch 106A is a hold switch that keeps the hydraulic fluid flowing in a certain direction to the hydraulic attachment provided with the working machine 1, and when operated, the hold switch sustains and holds the operation of the hydraulic actuator provided with the hydraulic attachment. The sixth switch 106 is a float switch that puts the lift arm 8, which supports the hydraulic attachment (working tool 9) in a floating state for vertical pivot, into a floating state. The seventh switch 106 is an unload switch that regulates the operation of the lift arm 8 and the hydraulic attachment, which switches the working machine 7 into an operable and inoperable state when operated.

Figure 17:
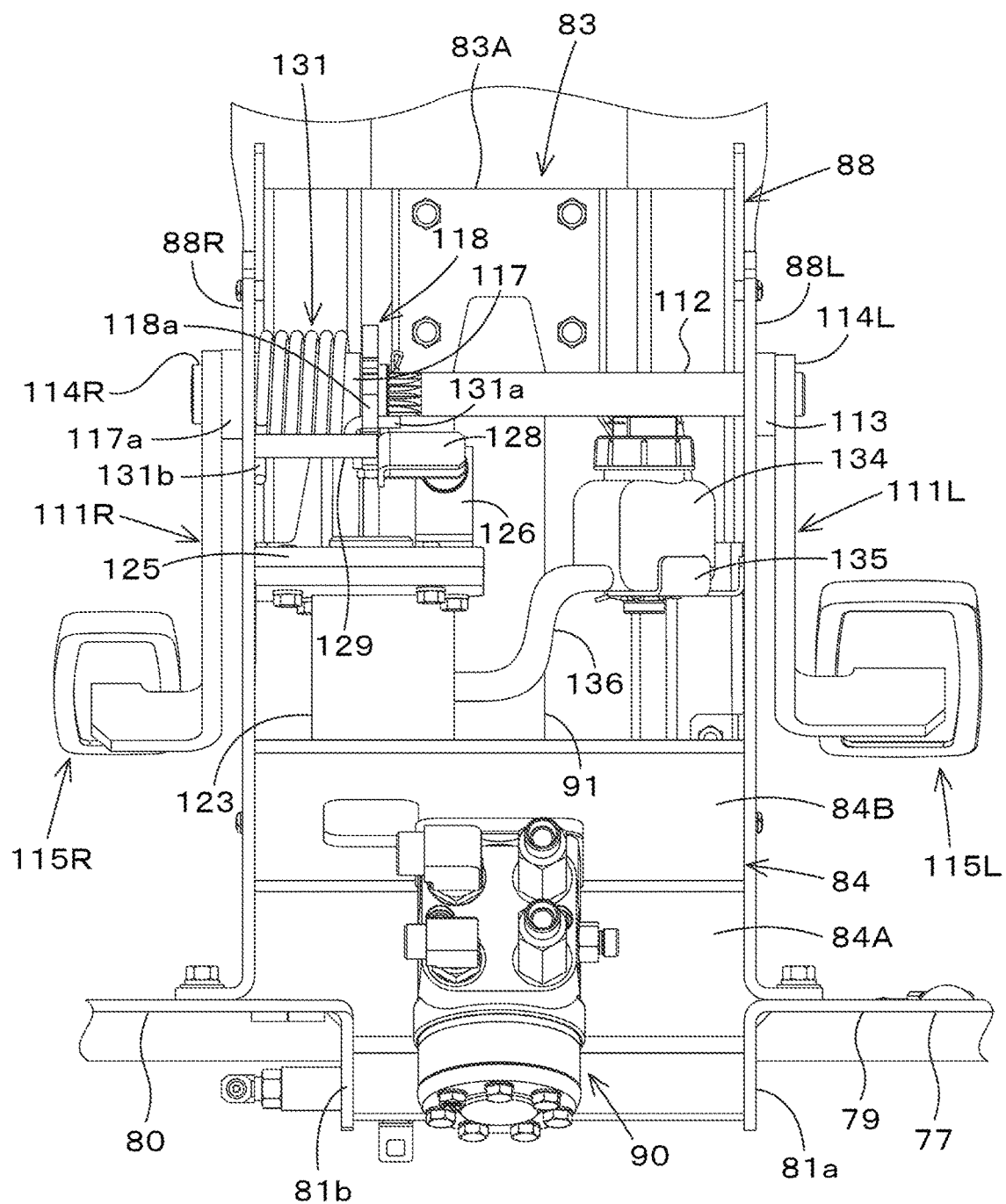
FIG. 17 is a front view of a brake pedal device and the like supported by a column frame.
Figure 18:
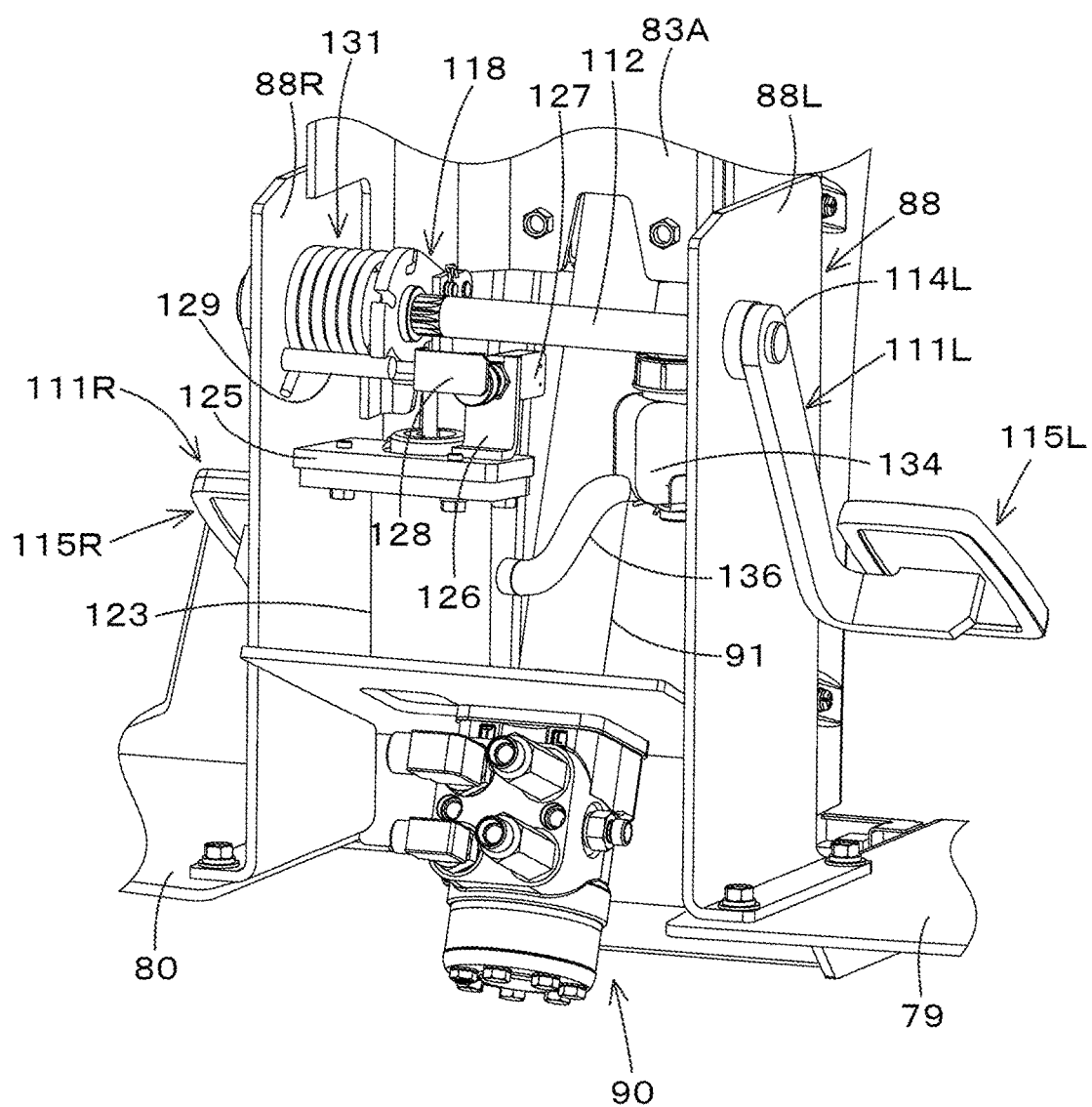
FIG. 18 is a view of a brake pedal device and the like supported by a column frame.

As shown in FIG. 17 and FIG. 18, a steering valve 90 for controlling the steering cylinder 6 is mounted on the lower side of the upper wall 84B. A steering post 91 for supporting the steering wheel 15 is attached to the upper wall 84B and the attachment wall portion 83A. The steering post 91 is provided in an inclined manner that transitions backwards from the upper wall 84B through the back side of the attachment wall portion 83A as it moves upwards. A steering shaft that transmits steering operations to the steering valve 90 is inserted into the steering post 91. A steering wheel 15 is attached to the top of the steering shaft.

As shown in FIG. 13, the side panel 171 including the right side of the cabin 14 includes a transparent portion 171a that allows the outside to be seen from between the second front pillar 142R of the cabin 14 and the console 104. Thus, the outside can be viewed from inside the cabin through the right side panel 171 of the cabin 14, improving visibility. The side panel on the left side of the cabin 14 is an entry and exit door 172 for getting in and out of the cabin 14 (see FIG. 1). In this embodiment, the right side panel 171 is also a door that can be opened and closed. Thus, the space between the second front pillar 142R and the console 104 may be used as a boarding passage to allow boarding and alighting from the right side of the cabin 14. The door on the right side (side panel 171) has a transparent door window 171A that is visible to the outside. This door window 171A includes the transparent portion 171A.

As shown in FIG. 17, a first brake pedal (brake pedal) 111L is arranged on the left side of the column frame 88. A second brake pedal (other brake pedal) 111R is arranged on the right side of the column frame 88. On the upper portion of the column frame 88, a brake shaft 112 is provided with a shaft center extending in the machine width direction K2. The brake shaft 112 is formed of a single rod material and penetrates the upper and front portions of the first and second side walls 88L and 88R, and is supported by these side walls 88L and 88R in a rotatable manner around the axis center.

The left portion of the brake shaft 112 protrudes leftwardly from a bearing boss 113 fixed to the outside of the first side wall 88L. A pedal boss (first pedal boss) 114L provided at the top of the first brake pedal 111L is fixed to this protrusion. Thus, the first brake pedal 111L rotates in unison with the brake shaft 112. The lower portion of the first brake pedal 111L is provided with a pedaling portion 115L that is operated by an operator. In other words, the first brake pedal 111L is a suspended brake pedal.

The right portion of the brake shaft 112 protrudes outwardly from the second side wall 88R. A pedal boss (second pedal boss) 114R, which is provided at the top of the second brake pedal 111R, is attached to the right portion of the brake shaft 112. Thus, the second brake pedal 111R also rotates in unison with the brake shaft 112. The lower portion of the second brake pedal 111R is also provided with a pedaling portion 115R that is operated by an operator. In other words, the second brake pedal 111R is also a suspended brake pedal.

Figure 19:
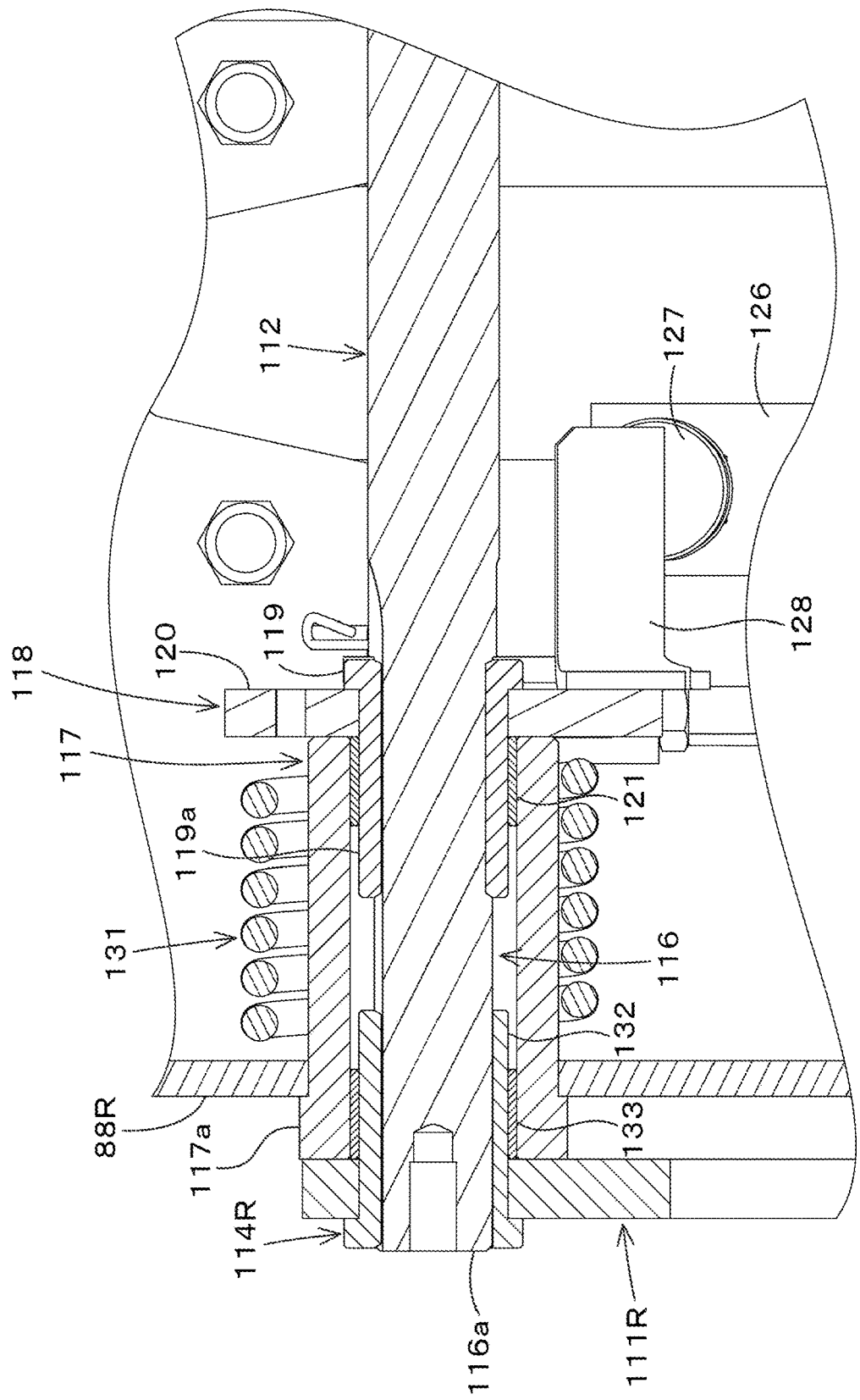
FIG. 19 is a front view of a support portion of a brake shaft.

As shown in FIG. 19, a coupler portion 116 is formed in the right portion of the brake shaft 112. The coupler portion 116 includes a spline. The coupler portion 116 is also formed to the right end of the brake shaft 112. A bearing cylinder 117 supporting the brake shaft 112 is fixed in the upper inner portion of the second side wall 88R. The bearing tube 117 penetrates the second side wall 88R and protrudes from the second side wall 88R toward the inside of the machine body. The bearing cylinder 117 is open at both ends in the axial direction, and the brake shaft 112 is inserted through the bearing cylinder 117. In other words, the bearing cylinder 117 encloses the coupler portion 116. The bearing cylinder 117 is concentric with the brake shaft 112. The bearing cylinder 117 has a large diameter portion 117a in contact with and welded to an outer surface of the second side wall 88R. The coupler portion 116 has a protrusion portion 116a protruding from a right end of the large-diameter portion 117a to the outside of the machine body (on a side opposite the side where the first brake pedal 111L is positioned). The coupler portion 116 protrudes from the left end of the bearing cylinder 117.

A brake arm 118 is arranged to the left of the bearing cylinder 117. The brake arm 118 has an arm boss 119 that is fitted to the brake shaft 112 and an arm portion 120 fixed to the arm boss 119. The arm boss 119 is spline coupled to the coupler portion 116 and rotates integrally with the brake shaft 112. The arm boss 119 has a bearing portion 119a that is inserted into the bearing cylinder 117.

A bush (referred to as the first bush) 121 is provided on the inside of the bearing cylinder 117. The first bush 121 includes a so-called DU bush and is fitted to the outside of the bearing portion 119a. The first bush 121 is in contact with the inner surface of the bearing cylinder 117 and with the outer surface of the bearing portion 119a. Thus, the brake shaft 112 is supported on the bearing cylinder 117 via the bearing portion 119a and the first bush 121.

Figure 20:
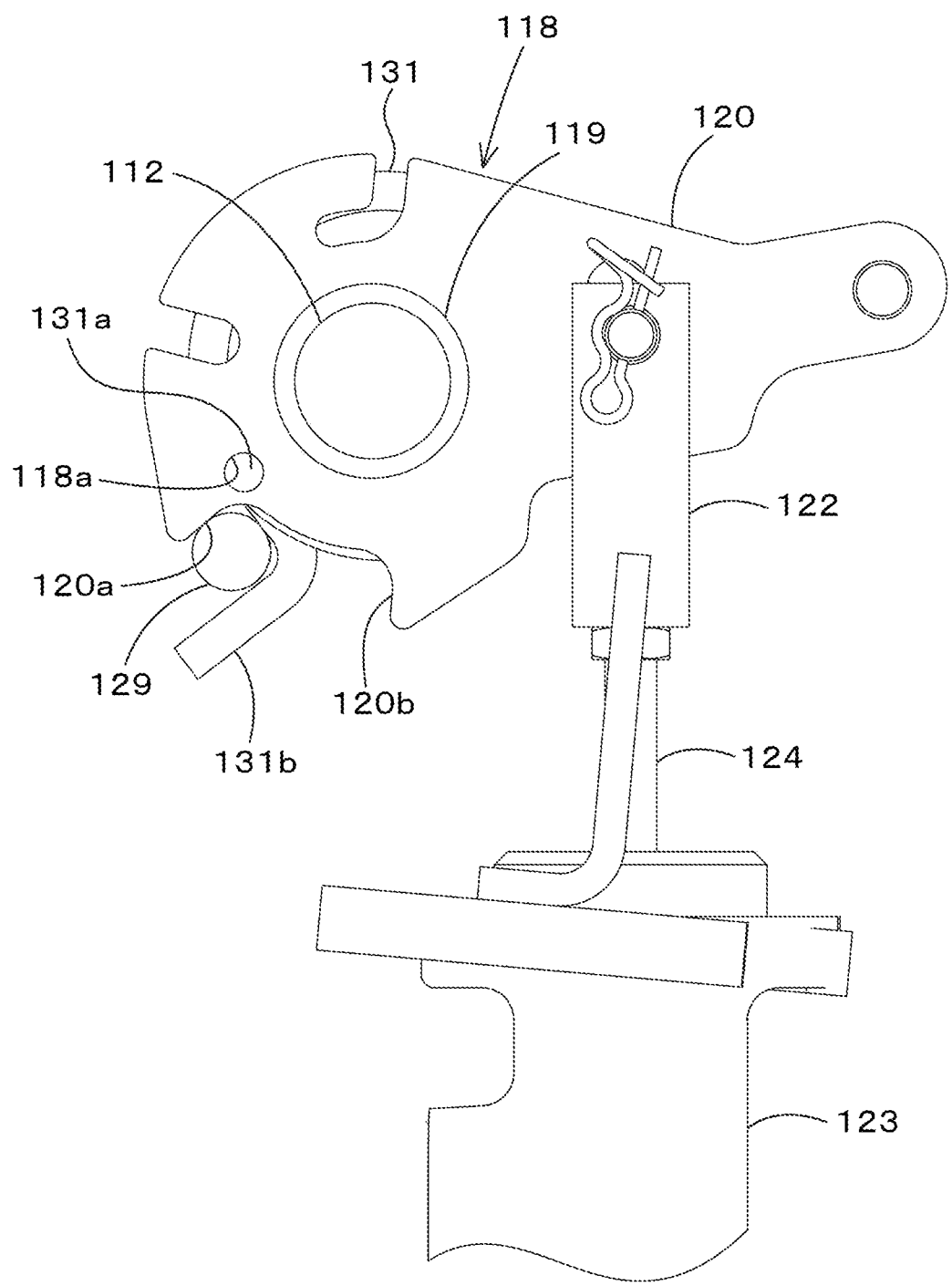
FIG. 20 is a side view of an attachment portion of a brake arm.

As shown in FIG. 20, one end of the connector link 122 is pivoted to the rear of the arm portion 120, and the other end of the connector link 122 is connected to the upper portion of the piston rod 124 of the master cylinder 123. Thus, by depressing the first brake pedal 111L or the second brake pedal 111R, the rear of the brake arm 118 pivots downward with the rotation of the brake shaft 112 and the piston rod 124 is pushed in through the connector link 122.

This activates the master cylinder 123 and also activates the brake system, which is not shown in the drawings.

As shown in FIG. 20, the arm portion 120 is provided with a first contact portion 120a and a second contact portion 120b. A regulator rod 129 is provided between the first contact portion 120a and the second contact portion 120b. As shown in FIG. 17, the regulator rod 129 is fixed to the second side wall 88R protruding inwardly into the machine body. When the first contact portion 120a contacts the regulator rod 129, the rocking of the first brake pedal 111L and the second brake pedal 111R in the direction opposite to the depressing direction of the first brake pedal 111L and the second brake pedal 111R (the anti-depressing direction) is regulated. The position of the brake pedals 111L and 111R with the first contact portion 120a in contact with the regulator rod 129 is the position before pressing the brake pedal 111L and 111R. The rocking of the first brake pedal 111L and the second brake pedal 111R in the depressing direction is regulated when the second contact portion 120b is in contact with the regulator rod 129.

As shown in FIG. 18, the master cylinder 123 is mounted on a bracket member 125 fixed to the second side wall 88R. A attachment stay 126 is fixed to the bracket member 125, and a detector switch 127 is attached to the attachment stay 126. The brake arm 118 is provided with a contacting member 128 which contacts the detector switch 127. By contacting the contact member 128 with the detector switch 127, the position of the first brake pedal 111L and the second brake pedal 111R before depressing the brake pedal 111R can be detected.

As shown in FIG. 17 and FIG. 18, a return spring 131 is provided inside the steering column 87 that returns the brake pedals 111L and 111R to the position they were in before the brake pedals 111L and 111R were operated (the set position when not operated). The return spring 131 is arranged on the right side between the first side wall 88L and the second side wall 88R. The return spring 131 includes a twisted coil spring and is provided to surround the brake shaft 112. In this embodiment, the return spring 131 is provided to surround the perimeter of the bearing cylinder 117. One end (the left-hand end) 131a of the return spring 131 is hooked to the spring-hanging portion 118a of the brake arm 118. The other end (right side end) 131b of the return spring 131 is hooked to the regulator rod 129. The return spring 131 thereby displaces the first brake pedal 111L and the second brake pedal 111R in a counter-pressing direction.

The second pedal boss 114R is fitted and splined into the protrusion portion 116a of the coupler portion 116 from the right side. This causes the second pedal boss 114R to rotate integrally with the brake shaft 112. The second pedal boss 114R has a shaft branching portion 132 that is inserted into the bearing cylinder 117. The outer circumference of the shaft branching portion 132 is fitted with a second bush (other bush) 133 provided on the inner side of the bearing cylinder 117. The second bush 133 includes a so-called DU bush. The second bush 133 is in contact with the inner surface of the bearing cylinder 117 as well as with the outer surface of the shaft branching portion 132. Thus, the brake shaft 112 is supported by the bearing cylinder 117 via the shaft branching portion 132 and the second bush 133. The second pedal boss 114R is detachable by a bolt or other means threaded into the brake shaft 112.

A second brake pedal 111R is selectively (optionally) provided on the working machine 1. When this second brake pedal 111R is not provided, a member of the substantially same configuration as the second pedal boss 114R is installed.

As shown in FIG. 17, a brake fluid tank 134 for storing brake fluid is deployed inside the steering column 87. The brake fluid tank 134 is arranged between the first side wall 88L and the second side wall 88R and on the left side. That is, it is arranged inside the first side wall 88L. The brake fluid tank 134 is arranged below the brake shaft 112. The brake fluid tank 134 is attached to an attachment stay 135 bolted to the inside of the first sidewall 88L. The brake fluid tank 134 is connected to the master cylinder 123 by a connector tube 136.

Figure 21:
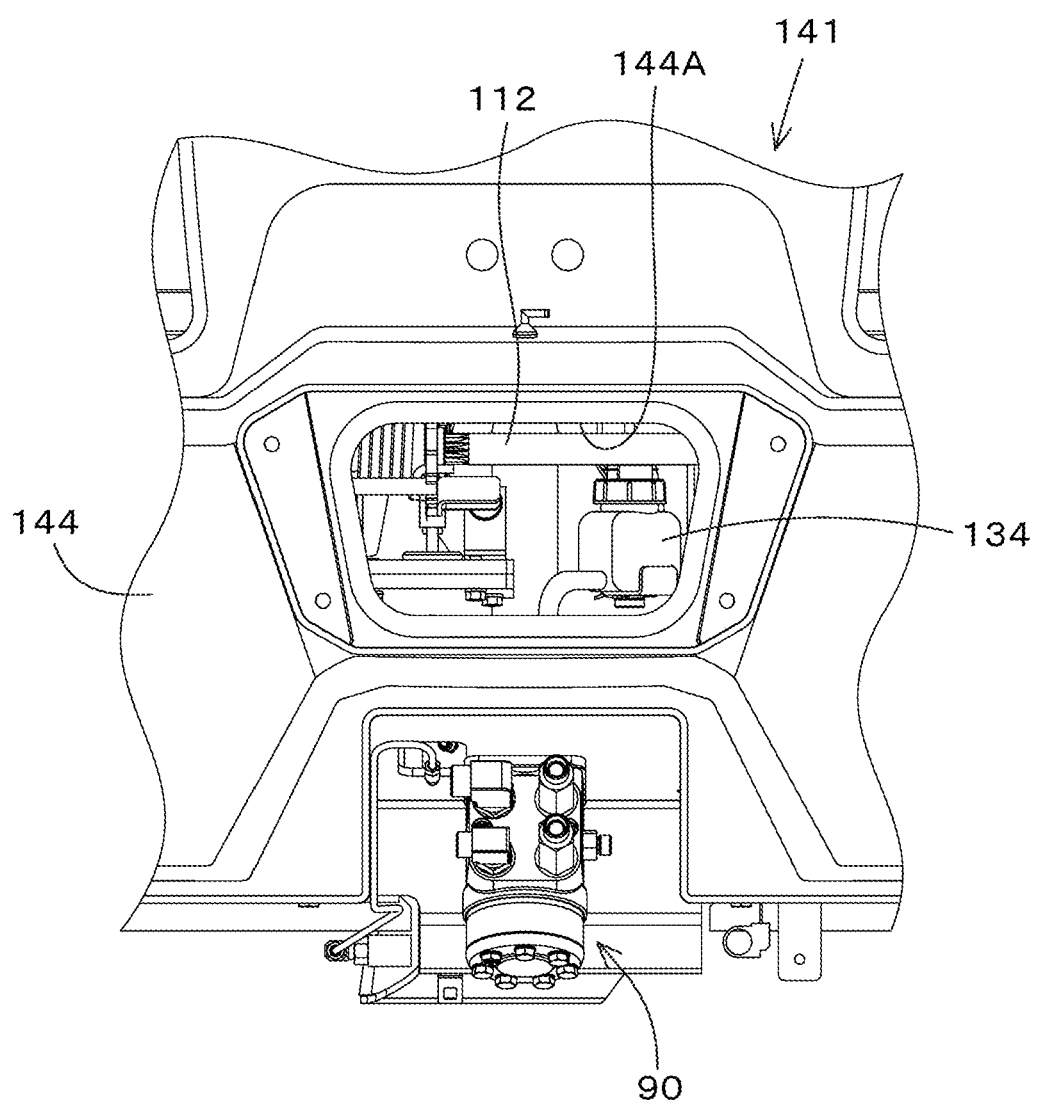
FIG. 21 is a front surface view of a front surface panel with an opening opened.
Figure 22:
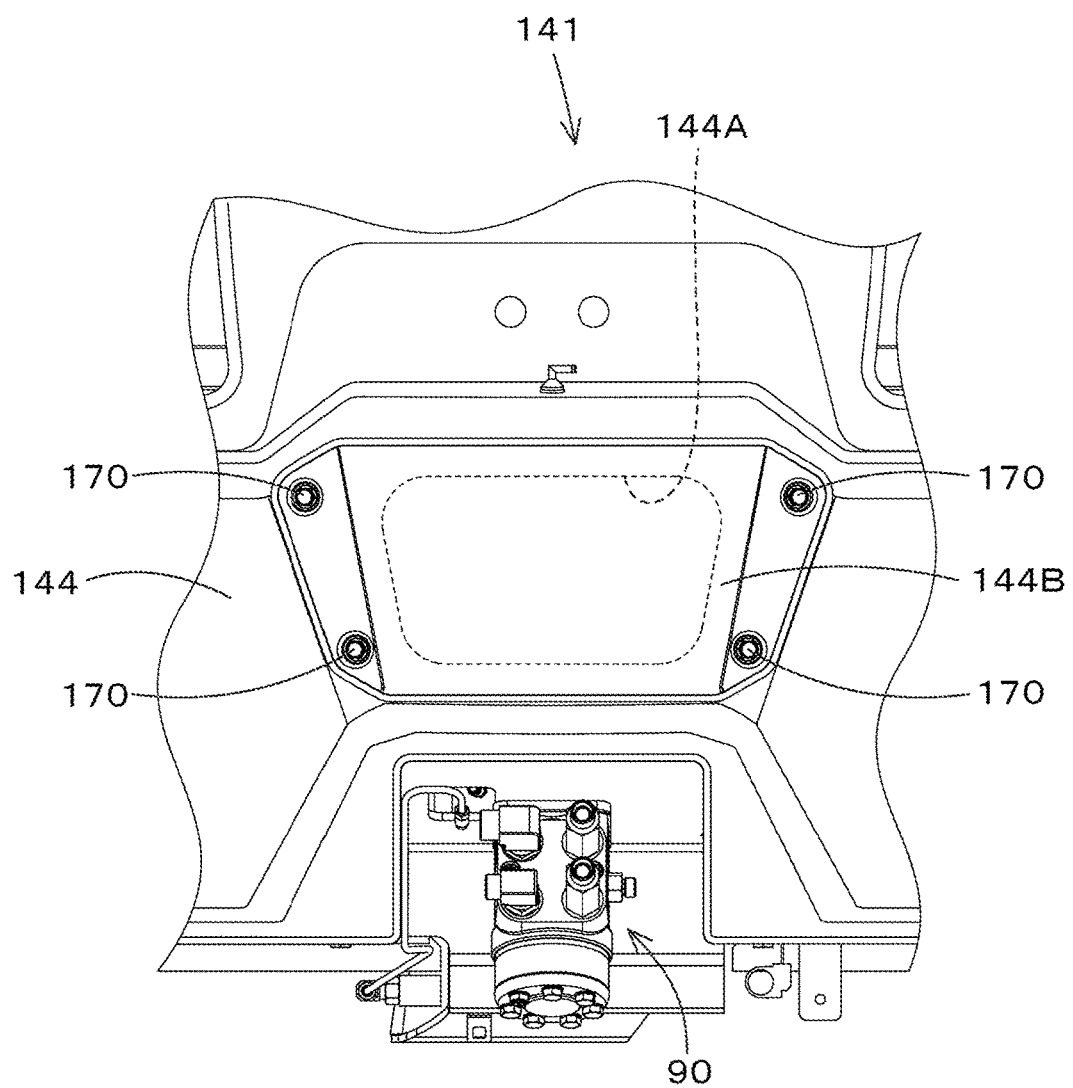
FIG. 22 is a front surface view of a front surface panel with an opening opened.

As shown in FIG. 21, the front panel 141 has a cover panel 144 having an opening 144A at the bottom that allows access to the brake fluid tank 134 from the front of the cabin 14. As shown in FIG. 22, the cover panel 144 has a detachable cover 144B that blocks the opening 144A. The detachable cover 144B is secured to the body portion of the cover panel 144 by a bolt 170 and is removable. By removing the detachable cover 144B, brake fluid can be supplied to the brake fluid tank 134 from outside the cabin 14. In addition, parts and other parts deployed in the steering column 87 can be maintained.

The support structure of the brake shaft 112 can be compacted by providing a return spring 131 constituted of a twisted coil spring in the outer circumference of the coupler portion 116 of the brake shaft 112, and the coupler portion 116 being supported by the bearing cylinder 117 via the arm boss 119 and the first bush 121 of the brake arm 118.

By compacting the support structure of the brake shaft 112, a space for the brake fluid tank 134 can be secured within the steering column 87 by making the support structure of the brake shaft 112 compact. By housing the brake fluid tank 134 in the steering column 87, the number of parts that obstruct the view in the cabin interior can be reduced compared to the case where the brake fluid tank 134 is located in the cabin interior, and visibility when looking out from the cabin interior can be improved.

By forming the return spring 131 with a twisted coil spring, the reliability of the brake pedal operation can be improved.

The brake fluid tank 134 may be arranged on the right side between the first side wall 88L and the second side wall 88R, and the master cylinder 123, the return spring 131, the bearing tube 117, the brake arm 118 and the like may be arranged on the left side between the first side wall 88L and the second side wall 88R.

Figure 23:
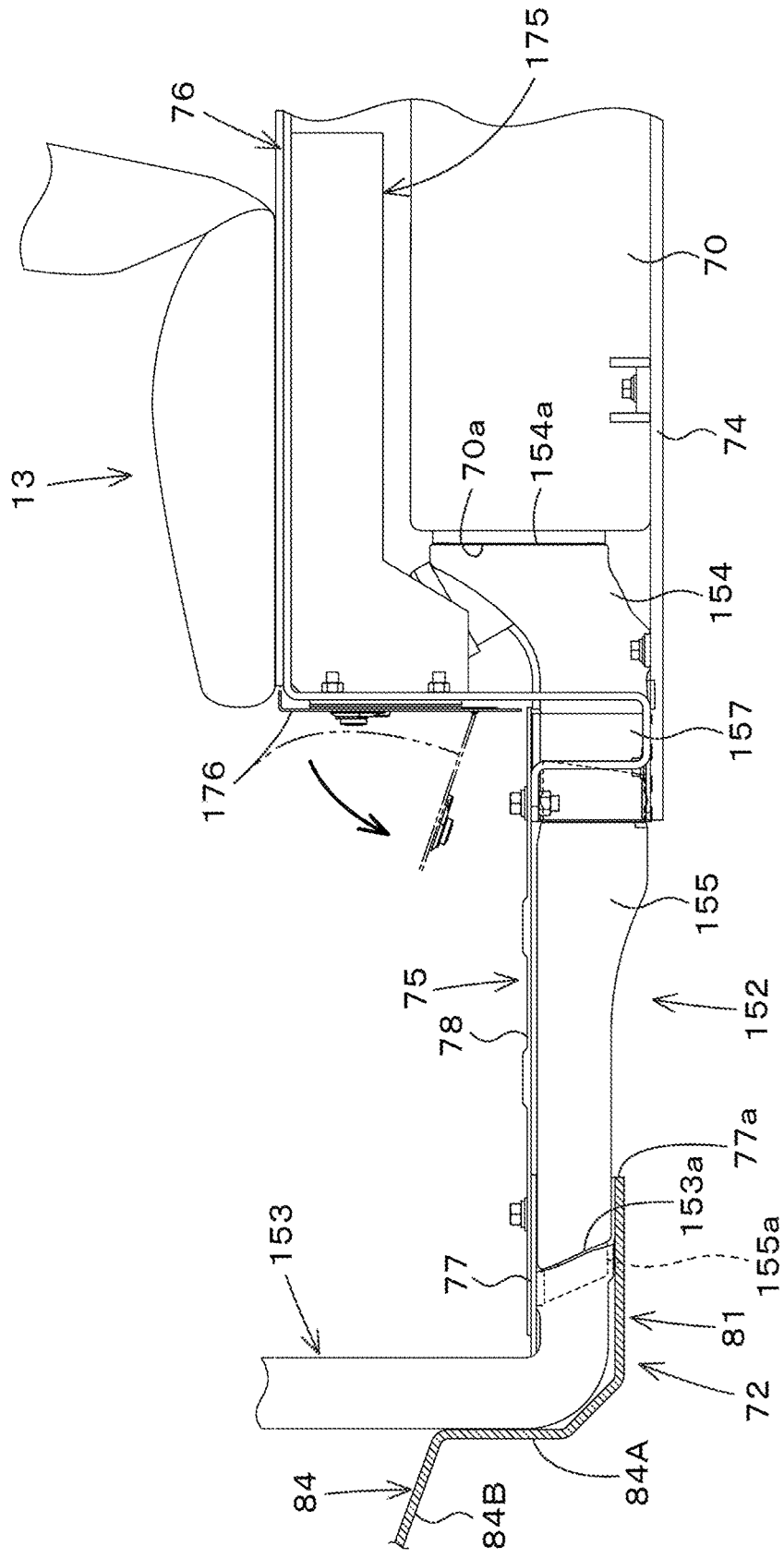
FIG. 23 is a cross section view of a side surface of an arrangement portion of a duct structure.

As shown in FIG. 23, a seat base 76 is attached to the bottom wall 74, and the operator seat 13 is attached to the seat base 76. An air conditioner main body 70 is arranged below the operator seat 13 (in the seat base 76). This air conditioner main body 70 is attached to the bottom wall 74. The air conditioner main body 70 is arranged in the center of the machine body 2 in the machine width direction K2. The air conditioner main body 70 has a case and a blower, an evaporator, and the like, housed in the case, and constitutes the main part of the air conditioner installed in the working machine 1. A storage box 175 is provided on the lower side of the upper wall of the seat base 76. The storage box 175 has a front side that can be opened and closed by a lid member 176. The storage box 175 is capable of storing, for example, a booklet such as an instruction manual.

Figure 24:
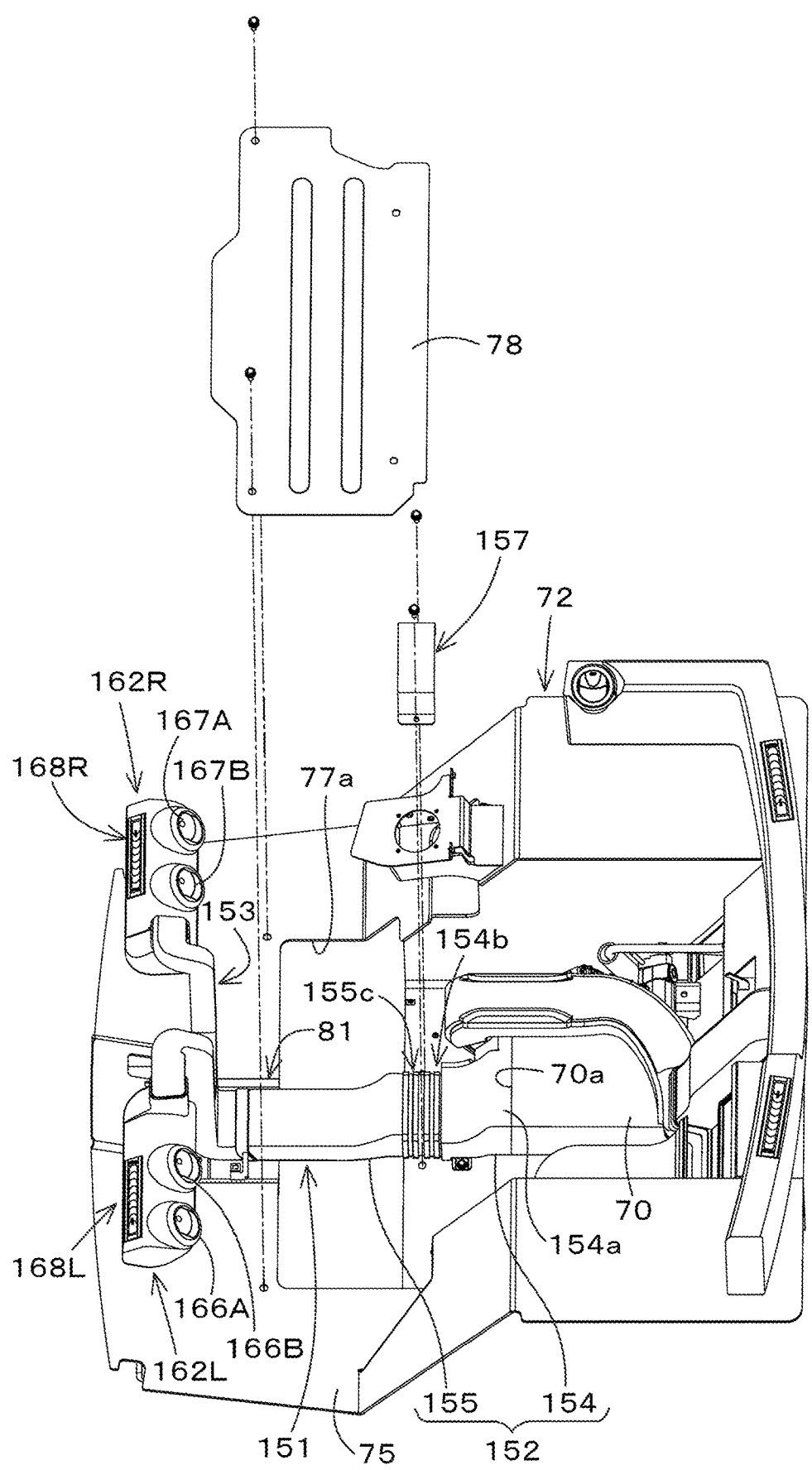
FIG. 24 is a perspective view of an arrangement portion of a duct structure seen from above.

As shown in FIG. 24, the working machine 1 is provided with a duct structure 151 that distributes conditioned air blown from the air blower slot 70a of the air conditioner main body 70. The air blower slot 70a is provided at the front of the air conditioner main body 70 and opens forward. The duct structure 151 has a first duct 152 and a second duct (third member) 153.

As shown in FIG. 23, the first duct 152 is connected to the blower slot 70a and extends through the lower side of the floor 75 (openable cover 78) of the cabin 14 towards the front (lower portion of the steering column 87). The second duct 153 is connected to the front of the first duct 152 and rises into the steering column 87 (see FIG. 27). The air conditioner main body 70, the first duct 152 and the second duct 153 are located in the center of the machine width direction K2.

As shown in FIG. 23, the first duct 152 has a first member 154 having a connection port 154a (referred to as the first connection port) 154a connected to the blower slot 70a, and a second member 155 extending forward from the first member 154.

Figure 25:
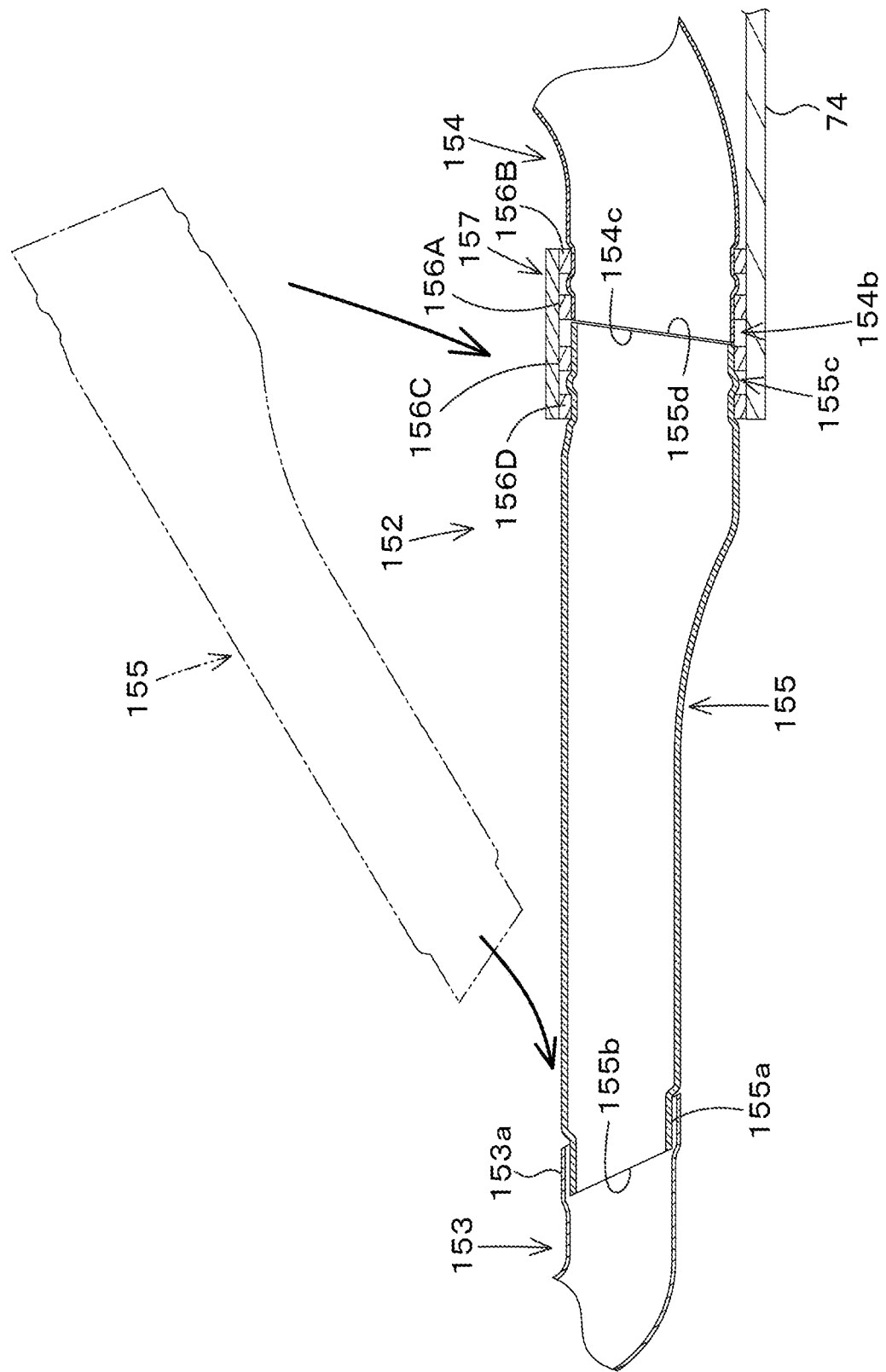
FIG. 25 is a cross section of side surfaces of a first duct and a second duct.

As shown in FIG. 25, the first member 154 has a connector portion 154b that is connected to the second member 155 at the front. The connector portion 154b is located below the first connection 154a and is attached to the bottom wall (installation portion) 74 by bolts 177 and the like (see FIG. 26). The front end (butt end) 154c of the connector portion 154b is formed in an inclined shape that shifts downward as it moves forward. A plurality of sealing materials (first seal material 156A, first seal material 156B) are provided in the connector portion 154B. The first seal material 156A and the first seal material 156B are formed in an annular shape and are arranged in the front-to-rear direction K1 at intervals and fitted to the outer circumference of the connector portion 154b. The first sealing member may be one or more than one, or three or more seal materials may be provided.

The second member 155 is formed in a cylindrical shape (rectangular in cross section) long in the front-to-rear direction K1. As shown in FIG. 25, the second member 155 extends forward from the connector portion 154b of the first member 154. In detail, as shown in FIG. 23, the second member 155 extends forward from between the front end side of the bottom wall 74 and the rear end side of the floor portion 75 (openable cover 78) and extends through the underside of the openable cover 78 and into the third portion 81 of the floor frame 72. In other words, the second member 155 extends from the first member 154 to the bottom of the second duct 153. As shown in FIG. 24, the second member 155 is located below the openable cover 78, and the inspection opening 77a is long in the machine width direction K2. That is, the inspection opening 77a is formed so that the inspection opening 77a crosses the second member 155 in the machine width direction K2 in a plan view. The second member 155 may be provided to fit within the inspection opening 77a.

As shown in FIG. 23, the second duct 153 has a connection port 153a at the bottom that is directed rearwardly (referred to as the second connection port). This second connection port 153a is located within the third portion 81 of the floor frame 72.

As shown in FIG. 25, the second member 155 has an inlet slot (first portion) 155a at the front (at one end in the longitudinal direction) that is inserted and connected to the second connection port 153a (the bottom of the second duct 153). The front end (connection end) 155b of the inlet slot 155a is formed in an inclined shape that shifts downward as it moves rearward. This makes it easier to connect the second member 155 in a rearwardly inclined position. In detail, the second member 155 can be easily inserted into the second connection port 153a in a posteriorly tilted posture with the rear end of the second member 155 in an inclined position in which the rear end is arranged above the front end of the second member 155 (configured to be inserted).

The second member 155 has a connector portion (second portion) 155c at the rear (the other end of the longitudinal direction) that is opposed and connected to the connector portion 154b of the first member 154. The rear end (an opposed end) 155d of the connector portion 155c is formed in an inclined shape that shifts downwardly as it moves forward. This makes it easier to make the connection when the rear of the second member 155 is lowered from above and connected to the first member 154. A plurality of sealing members (second sealing member 156C and second sealing member 156D) are provided in the connector portion 155C. The second sealing member 156C and the second sealing member 156D are formed in an annular shape and are arranged in the front-to-rear direction K1 at intervals and fitted to the periphery of the connector portion 155C. The second sealing member may be one or more than one, or three or more of the second sealing member may be provided.

Figure 26:
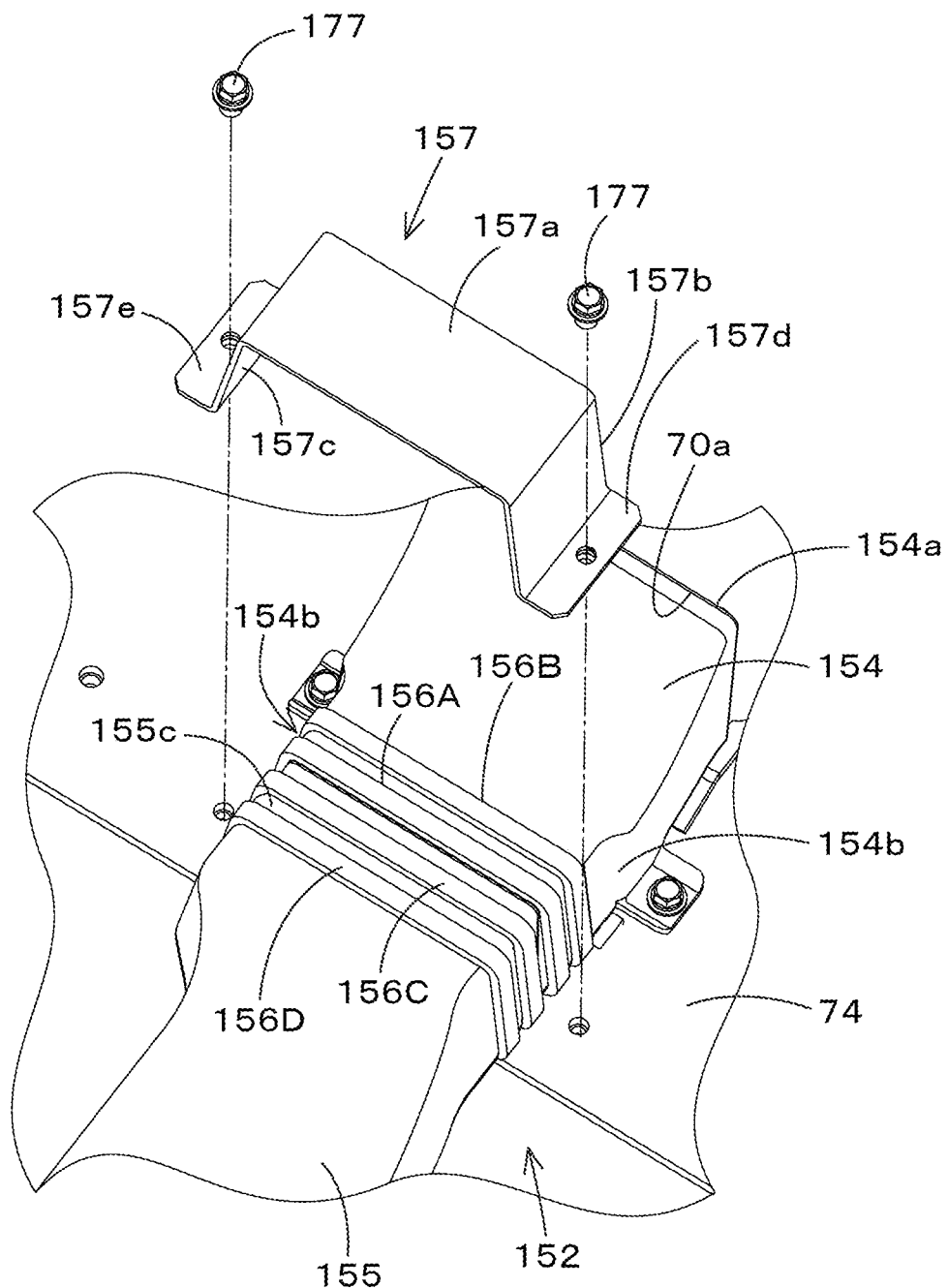
FIG. 26 is a perspective view of a connecting portion between a first member and a second member.

As shown in FIG. 25, a cover plate 157 is provided over the connector portion 154b of the first member 154 and the connector portion 155c of the second member 155. As shown in FIG. 26, the cover plate 157 has an upper wall 157a, a first side wall 157b extending downwardly from a left end of the upper wall 157a, and a second side wall 157c extending downwardly from a right end of the upper wall 157a. The upper wall 157a covers the top of the connector portion 154b and the connector portion 155c. The first side wall 157b covers the left side of the connector portion 154b and the connector portion 155c. The second side wall 157c covers the left side of the connector portion 154b and the connector portion 155c. The upper wall 157a, the first side wall 157b and the second side wall 157c are intimately capable of being attached to the first seal materials 156A and 156B and the second seal materials 156C and 156D.

As shown in FIG. 26, the first side wall 157b has at its lower end a flange wall 157d extending to the left, and the second side wall 157c has at its lower end a flange wall 157e extending to the right. The flange wall 157d and the flange wall 157e are secured to the bottom wall 74 by a bolt 177. This allows the connector portion 154b and the connector portion 155c to be held down by the cover plate 157. The first sealing members 156A and 156B and the second sealing members 156C and 156D and the cover plate 157 ensure the sealing of the butt portion of the connector portion 154B and the connector portion 155C.

In the duct structure 151 described above, the second member 155 is installed in the following manner.

First, with the openable cover 78 removed, the second member 155 is tilted backward and the insertion port 155a is inserted into the second connection port 153a while the rear end of the second member 155 is lowered and the rear end 155d of the connector portion 155c is brought together with the front end 154c of the connector portion 154b. The cover plate 157 is then attached to the bottom wall 74.

The removal of the second member 155 is done by the reverse operation of the above operation.

In the first duct 152, the second member 155, which is the part corresponding to the inspection opening 77a, is detachable, and by removing the second member 155, there is no longer any member that would interfere with the inspection and the inspection can be easily performed.

The attachment structure of the second member 155 is not limited to the structure described above, and may, for example, be connected by inserting the rear portion of the second member 155 into the first member 154 and connecting the front portion of the second member 155 to the second duct 153 in an opposed configuration.

Figure 27:
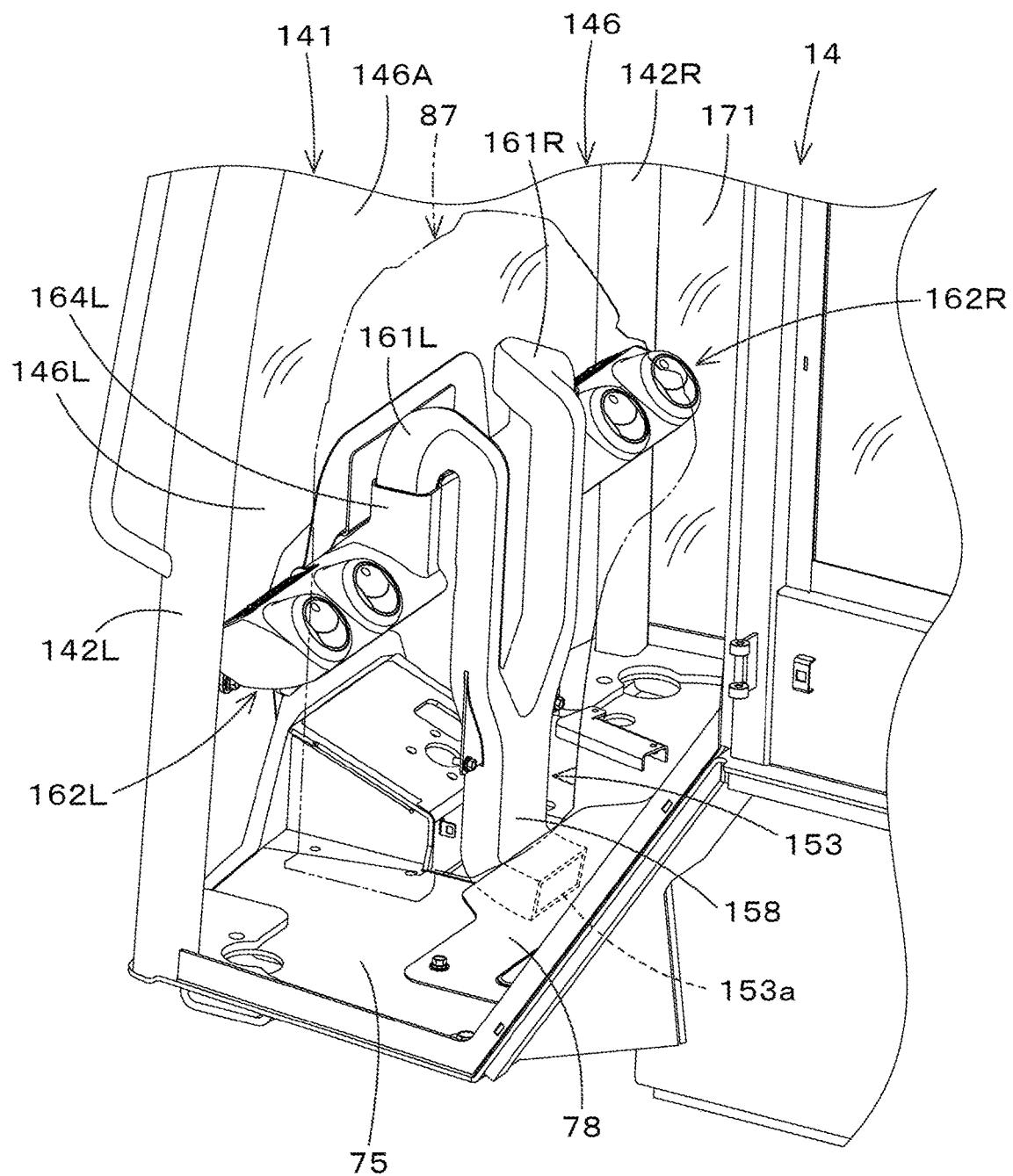
FIG. 27 is a perspective view of an arrangement portion where a second duct, a first side duct, and a second side duct are arranged.

As shown in FIG. 27, the second duct 153 rises upwardly from the second connection port 153a in the interior of the steering column 87. The second duct 153 also rises at the rear of the column frame 88, as shown in FIG. 28.

Figure 28:
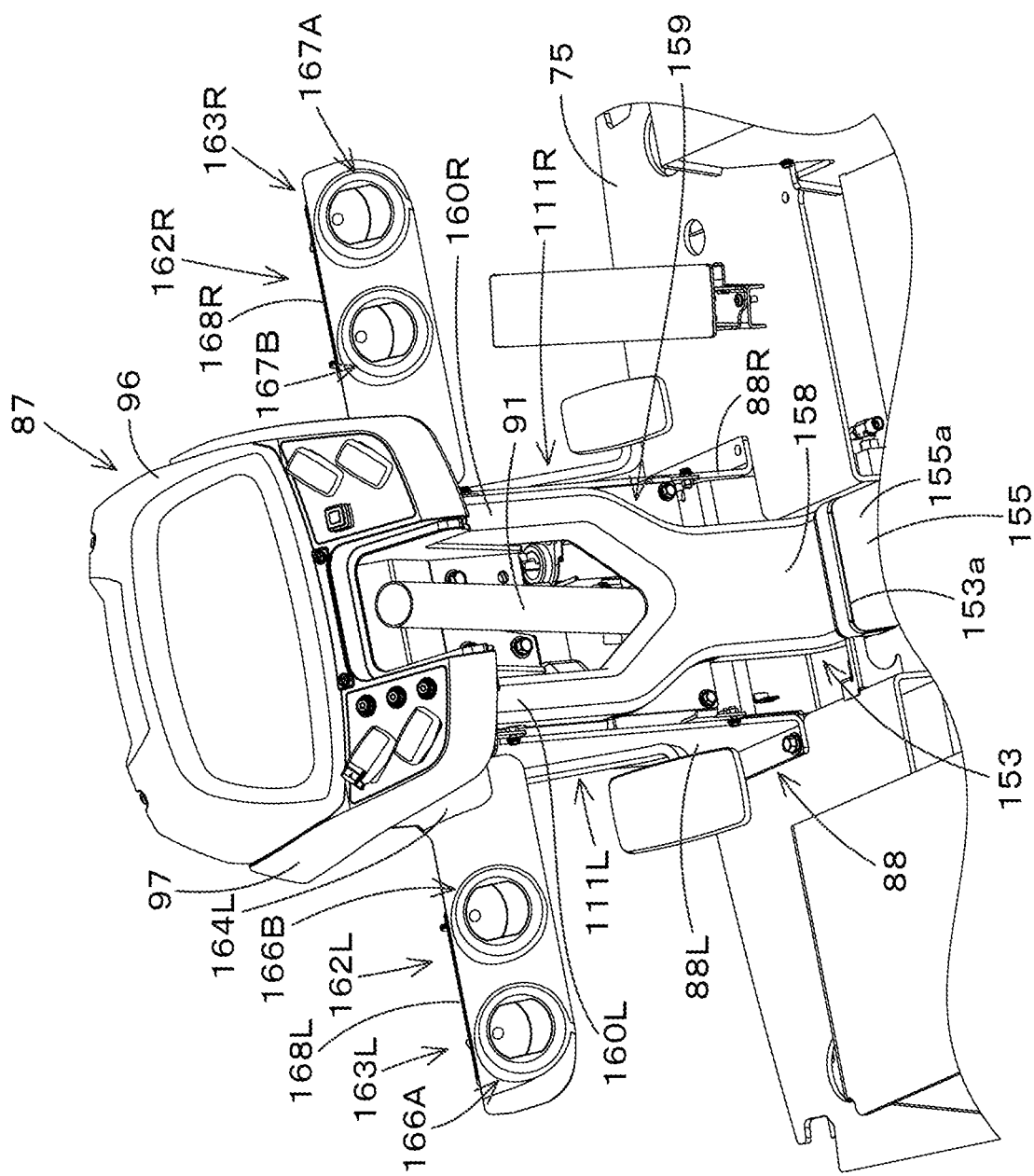
FIG. 28 is a perspective view of a front portion of a cabin interior seen from a back surface side.

As shown in FIG. 28, the second duct 153 has a lower base portion 158 and an upper branching portion (branching portion) 159. The base site 158 has a second connection port 153a and is located at the bottom of the column frame 88. The branching portion 159 extends upwardly from the base portion 158 and branches in a bifurcated manner by dodging the steering post 91. In detail, the branching portion 159 has a first branching portion 160L located to the left of the steering post 91 and a second branching portion 160R located to the right of the steering post 91.

The first branching portion 160L extends above the column frame 88 through the back side of the one side wall portion 83L. The second branching portion 160R extends above the column frame 88 through the back side of the other side wall portion 83R. The upper portion of the first branching portion 160L is located within the upper portion of the first cover member 96 and the second cover member 97. The upper portion of the second branching portion 160R is located within the upper portion of the first cover member 96 and the second cover member 97 (see FIG. 28).

Figure 29:
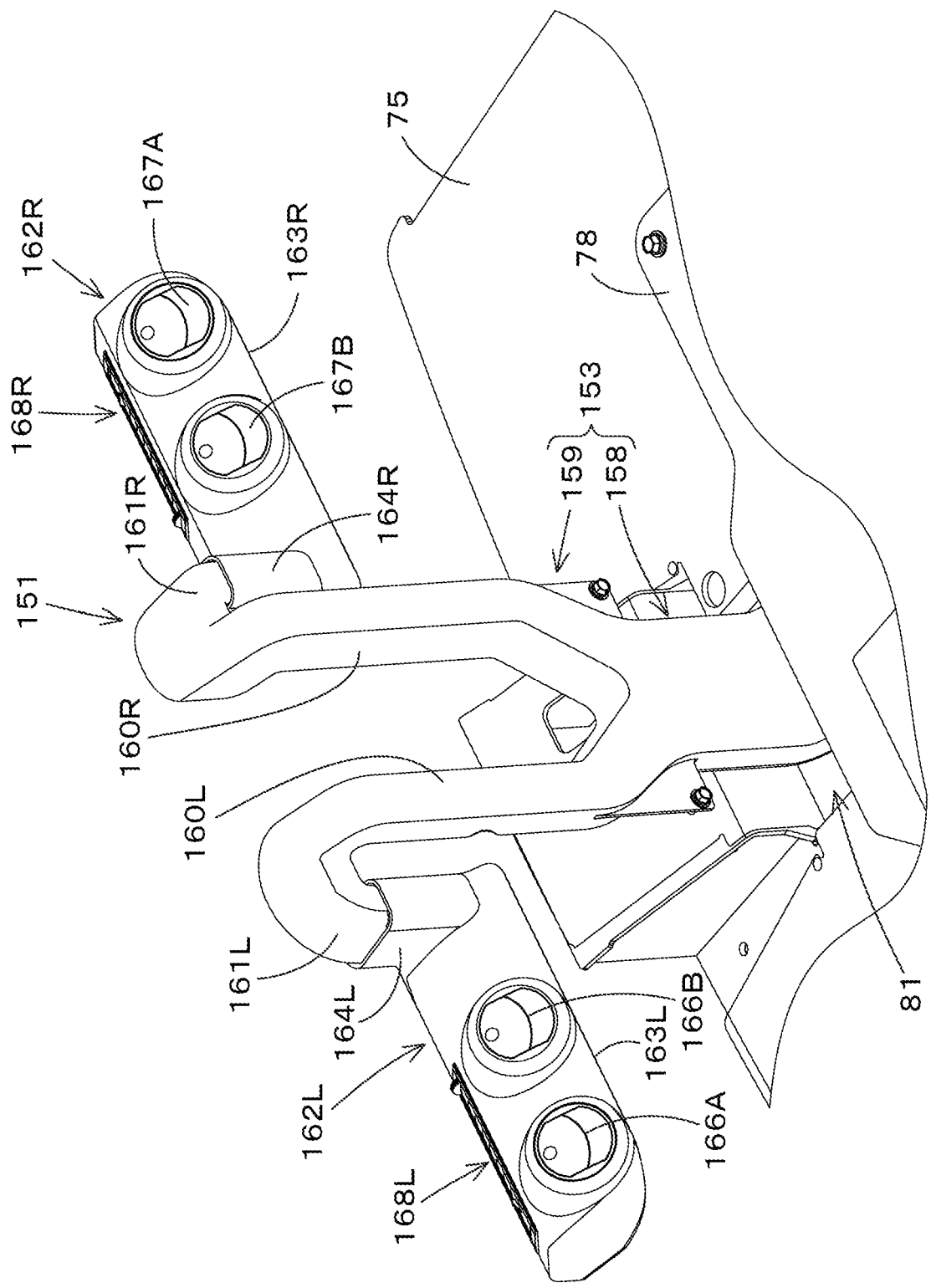
FIG. 29 is a perspective view illustrating a connection structure where a second duct, a first side duct, and a second side duct are connected.

As shown in FIG. 29, the first branching portion 160L has a first connector portion 161L that bends downwardly at the tip (upper portion). The first connector portion 161L has an opening that is oriented downwardly. The second branching portion 160R has a second connector portion 161R that bends downwardly at the tip (upper portion). The second connector portion 161R has an opening that is oriented downwardly.

As shown in FIG. 29, the duct structure 151 has a first side portion 162L connecting to the first branching portion 160L and a second side portion 162R connecting to the second branching portion 160R.

As shown in FIG. 28, the first side duct 162L is located to the left (one side) of the upper portion of the column frame 88 (the upper portion of the steering column 87). The first side portion duct 162L has a first side body 163L extending from the column frame 88 side toward the left and a first extension 164L extending upwardly from the right portion of the first side body 163L.

As shown in FIG. 29, the first side body 163L has a plurality of blower portions (first blower portion 166A and first blower portion 166B) on the rear side of the top and a third blower portion (third blower portion 168L) on the front side of the top. The first blower portion 166A and the first blower portion 166B blow conditioned air into the cabin interior. As shown in FIG. 27, the first lower position 146L of the front window 146 is located forward of the first side duct 162L, and the third blower portion 168L blows conditioned air toward the first lower position 146L. As shown in FIG. 13, the first extension 164L inserts into the column cover 89 by inserting the left portion of the second portion 98B of the third cover member 98. As shown in FIG. 29, the first connector portion 161L is connected to the first extension 164L from above. This allows for easy assembly.

The first side body 163L is arranged below the second portion 98b of the third cover member 98. The first brake pedal 111L is arranged below the first side body 163L (see FIG. 28).

As shown in FIG. 28, the second side duct 162R is arranged to the right (on the other side) of the upper portion of the column frame 88. The second side portion duct 162R has a second side body 163R extending from the column frame 88 side toward the right, and a second extension 164R extending upwardly from the left portion of the second side body 163R.

As shown in FIG. 29, the second side body 163R has a plurality of blower portions (second blower portion 167A and second blower portion 167B) on the rear side of the top and a third blower portion (third blower portion 168R) on the front side of the top. The second blower portion 167A and the second blower portion 167B blow conditioned air into the cabin interior. As shown in FIG. 27, the second lower position 146R of the front window 146 is located forward of the second side duct 162R, and the third blower portion 168R blows conditioned air toward the second lower position 146R. The second extension 164R inserts the right portion of the second portion 98B of the third cover member 98 into the column cover 89. As shown in FIG. 29, the second connector portion 161R is connected to the second extension 164R from above. This allows for easy assembly.

The second side body 163R is also arranged below the second portion 98b of the third cover member 98. The second brake pedal 111R is also arranged below the second side portion 162R (see FIG. 28).

The first blower portion may be one or more than one, or three or more. The second blower portion may also be one or more than three. The third blower portion 168L may be provided, and the third blower portion 168R may also be provided.

The upper portion of the second duct 153 can be bent downwardly and the side duct (162L and 162R) is provided with an extension (164L and 164R) extending upwardly, and by connecting the upper portion of the second duct 153 to the extension of the side duct, the height position of the side duct can be lowered downwardly. This can improve the visibility from the front window 146 (first lower position 146L, second lower position 146R).

The duct structure 151 is arranged in the steering column 87 through the bottom side of the floor portion 75 and the brake fluid tank 134 is housed in the steering column 87, thereby eliminating obstacles to the view from both sides of the steering column 87 in the front of the cabin. This allows the upper surface of the first side body 163L and the second side body 163R to be arranged further below the second cover member 97 of the steering column 87, which is arranged below the steering wheel 15, so that the lower left and lower right portions of the front window 146 can be extended below the second cover member 97, thereby improving the forward visibility.

The working machine of the embodiment has the following effects.

The working machine 1 includes the machine body 2, the lift arm 8 attached vertically and pivotally on the machine body 2, the working tool 9 mounted on the front portion of the lift arm 8, the quick coupler 32 having the connector pins (the first pin 40L and the second pin 40R) connecting the lift arm 8 and the working tool 9 and the coupler cylinder 42 to move the connector pin for de-coupling and coupling, and the lock release valve 61 that operates the coupler cylinder 42 to release the coupling. The lock release valve 61 is attached to the quick coupler 32.

According to this configuration, the hydraulic pipeline arrangement can be simplified.

In addition, the lift arms 8 include the first arm 8L and the second arm 8R spaced apart in the machine width direction K2 and provided in such a way that the spacing is progressively widened as extending forward, and the connector pins include the first pin 40L provided at the front of the first arm 8L and the second pin 40R provided at the front portion of the second arm 8R.

According to this configuration, the status of the coupler pin is easily visible from the operator seat 13, and the ease of checking the status of the coupler pin can be enhanced.

In addition, the quick coupler 32 has the first engagement portion (the engagement pin 39L) that engages and disengages with the working tool 9 on the first arm 8L side, the second engagement portion (the engagement pin 39R) that engages and disengages with the working tool 9 on the second arm 8R side, the first plate 41L that connects the first engagement portion to the first pin 40L, and the second plate 41R that connects the second engagement portion to the second pin 40R, and the lock release valve 61 is mounted on the first plate 41L or the second plate 41R.

According to this configuration, the piping path between the coupler cylinder 42 and the lock release valve 61 can be simplified.

In addition, the working machine 1 includes the first hydraulic pipeline 52L arranged along the first arm 8L from the machine body 2 side to the front of the first arm 8L, the first connector member 63L to which the first hydraulic pipeline 52L is connected and attached to the first plate 41L, the second hydraulic pipeline 52R arranged along the second arm 8R from the machine body 2 side to the front of the second arm 8R, and the second connector member 63R to which the second hydraulic pipeline 52R is connected and attached to the second plate 41R.

By allocating, to the first arm 8L and the second arm 8R, the hydraulic pipeline arranged from the body 2 side to the front of the lift arm 8, the piping route can be simplified.

In addition, the first connector member 63L has the first output portion 56L capable of taking out the hydraulic fluid and the first output portion 57L capable of outputting the hydraulic fluid, and the second connector member 63R has the second output portion 56R capable of taking out the hydraulic fluid and the second output portion 57R capable of outputting the hydraulic fluid, one of the first output portion 57L or the second output portion 57R being connected to the head side of the coupler cylinder 42 and the other being connected to the lock release valve.

According to this configuration, the piping route to the coupler cylinder 42 can be simplified.

In addition, the lock release valve 61 has the main body valve 61A to actuate the coupler cylinder 42 and the solenoid portion 61B to control the main body valve 61A.

According to this configuration, for example, the regulation of the operation of the lock release valve can be easily regulated electrically and the certainty of unlocking can be increased.

In addition, the cover member 64 covering the solenoid portion 61B is provided.

According to this configuration, the solenoid portion 61B can be protected.

In addition, the working machine 1 includes the machine body 2, the first arm 8L and the second arm 8R extending forward from the machine body 2 and spaced in the machine width direction K2 such that the spacing is progressively widened as the distance between the arms widens in the machine width direction K2, the working tool 9 mounted on the front portion of the first arm 8L and the second arm 8R, the auxiliary control valve 38 to control the hydraulic actuator provided to the working tool 9, the first hydraulic pipeline 52L arranged along the first arm 8R from the auxiliary control valve 38 to the front portion of the first arm 8L, the second hydraulic pipeline 52R arranged along the second arm 8R from the auxiliary control valve 38 to the front portion of the second arm 8R, the first connector member 63L having the first take-out portion 56L from which the operation fluid can be taken, the first take-out portion 56L being connected to the first hydraulic pipeline 52L, and the second connector member 63R having the second take-out portion 56R from which the operation fluid can be taken, the second take-out portion 56R being connected to the second hydraulic pipeline 52R.

According to this configuration, it is possible to simplify the arrangement of the hydraulic pipeline in the external hydraulic take-out structure.

In addition, the working machine 1 includes the connector pipe 26 connecting the first arm 8L and the second arm 8R, the connector pipe 26 is formed in an elliptical shape having a cross-section shape long in the longitudinal direction of the first arm 8L and the second arm 8R, and the first hydraulic pipelines 52L and the second hydraulic pipelines 52R are arranged by passing through the lower side of the connector pipe 26.

According to this configuration, the visibility of the front of the machine body from the operator seat can be improved.

In addition, the working machine 1 includes the first pin 40L for connecting the first arm 8L to the working tool 9, the second pin 40R for connecting the second arm 8R to the working tool 9, the coupler cylinder 42 for moving the first pin 40L and the second pin 40R in order to uncouple and uncouple, and the coupler cylinder 42 for operating the coupler cylinder 42 for releasing the coupling. The first connector member 63L has a first output portion 57L capable of outputting hydraulic fluid to the head side of the coupler cylinder 42, and the second connector member 63R has a second output portion 57R capable of outputting hydraulic fluid to the lock release valve 61.

According to this configuration, the structure of the hydraulic pipeline arrangement for the coupler cylinder 42 can be simplified.

In addition, the coupler cylinder 42 has a cylinder tube 42A extended in the machine width direction K2 between the front portions of the first arm 8L and the second arm 8R, wherein the first pin 40L is movable in the machine width direction on one end of the cylinder tube 42A, and the second pin 40R is movable in the machine width direction on the other end of the cylinder tube 42A.

According to this configuration, the structure of the quick coupler 32 can be simplified.

In addition, the working machine 1 includes the machine body 2, the cabin 14 mounted on the machine body 2, the steering column 87 located at the front of the interior of the cabin 14, and the brake fluid tank 134 for storing brake fluid, and the brake fluid tank 134 is deployed in the steering column 87.

According to this configuration, compared to the case where the brake fluid tank is deployed in the cabin compartment, it is possible to improve the livability of the cabin compartment and to improve visibility when looking out from the cabin compartment.

In addition, the working machine 1 has the removable detachable cover 144B that removably blocks an opening 144A that allows access to the brake fluid tank 134 from the front of the cabin 14.

According to this configuration, brake fluid can be refilled into the brake fluid tank 134 from the front of the cabin 14.

In addition, the detachable cover 144B forms a part of the front panel 141 of the cabin 14.

According to this configuration, the structure can be simplified by the dual use of components.

In addition, the working machine 1 includes the brake pedal 111L and the return spring 131 that returns the brake pedal 111L to the unoperated position. And, the steering column 87 has the first sidewall 88L and the second sidewall 88R spaced apart in the machine width direction K2, and the brake fluid tank 134 is arranged on the inside of one of the side walls 88R and the first sidewall 88L, the return spring 131 includes a twisted coil spring and surrounds the brake shaft 112 provided over the first side wall 88L and the second side wall 88R, and is arranged on the inside of the other one of the first side wall 88L or the second side wall 88R.

According to this configuration, the support structure of the brake pedal 111L can be compacted and the space for the brake fluid tank 134 can be secured in the steering column 87.

In addition, the working machine 1 is provided with the master cylinder 123 operated by the brake pedal 111L, and the master cylinder 123 is provided on the arrangement side of the return spring 131 between the first side wall 88L and the second side wall 88R.

According to this configuration, a space for the placement of the brake fluid tank 134 can be provided in the steering column 87.

In addition, the working machine 1 includes the operator seat 13 provided in the interior of the cabin 14 and the console 104 provided on the right side of the operator seat 13, and the cabin 14 has the side panel 171 including the transparent portion 171a visible to the outside from between the front pillar 142R and the console 104 on the right side of the cabin 14.

According to this configuration, the visibility of the side of the cabin 14 from the operator seat 13 can be improved when viewing the side of the cabin 14 from the operator seat 13.

The working machine 1 includes the operator seat 13, the steering wheel 15 arranged in front of the operator seat 13, the steering column 87 covering the steering post 91 supporting the steering wheel 15, the air conditioner main body 70 installed below the operator seat 13, the duct structure 151 for distributing conditioned air blown from the blower slot 70a of the air conditioner main body 70. The duct structure 151 including the first duct 152 connected to the blower slot 70a and extends toward the lower portion of the steering column 87 through the underside of the floor portion 75 of the cabin 14 surrounding the operator seat 13, and the second duct 153 connected to the front portion of the first duct 152 rising into the steering column 87.

According to this configuration, it is possible to improve the habitability of the cabin compartment and the visibility of the cabin compartment when looking out from inside the cabin compartment.

In addition, the duct structure 151 includes the first side duct 162L having the first blower portions 166A and 166B that extends from the top of the steering column 87 toward one side of the machine width direction K2 and blows the conditioned air into the cabin, and the second side duct 162R having the second blower portions 167A and 167B that extends from the top of the steering column 87 toward the other side of the machine width direction K2 and blows the conditioned air into the cabin. The second duct 153 branches into the left and right sides of the steering post 91 inside the steering column 87, the first side duct 162L is connected to the first branching portion 160L that is one of the branching portions of the second duct 153, and the second side duct 162R is connected to the second branching portion 160R that is the other one of the branching portions of the second duct 153.

According to this configuration, the duct structure 151 can be well distributed into a left side duct and a right side duct within the steering column 87.

In addition, the first side duct 162L has the first extension 164L extending upwardly, and the second side duct 162R has the second extension 164R extending upwardly, wherein the first branching portion 160L is connected from above to the first extension 164L by bending downwardly at the tip, and the second branching portion 160R is connected from above to the second extension 164R by bending downwardly at the tip.

According to this configuration, the assembly of the first side duct 162L and the first branching portion 160L and the assembly of the second side duct 162R and the second branching portion 160R can be easily performed. Also, the height positions of the first side duct 162L and the second side duct 162R can be lowered to improve visibility in front of the machine body.

In addition, the front panel 141 of the cabin 14 has the front window 146 having the transparent front window 146 that allows forward visibility, and the front window 146 has the first lower position 146L located on one side of the upper portion of the steering column 87 and forward of the first side duct 162L, and the second lower position 146R located on the other side of the upper portion of the steering column 87 and forward of the second side duct 162R.

According to this configuration, the visibility in front of the machine body can be further improved.

The floor portion 75 has the floor body 77 having the inspection opening 77a and an openable cover 78 that blocks the inspection opening 77a, and the first duct 152 has a detachable portion corresponding to the inspection opening 77a.

According to this configuration, members that interfere with the inspection can be removed and the lower portion of the floor 75 can be easily inspected.

In addition, the working machine 1 includes the air conditioner main body 70, the duct structure 151 for distributing the conditioned air blown from the blower slot 70a of the air conditioner main body 70. The duct structure 151 includes the first member 154 connected to the blower slot 70a, the second member 155 extending from the first member 154, the third member (the second duct 153) to which the second member is connected 155. The second member 155 has the first portion (the insert slot 155a) at one end side of the longitudinal direction and the second portion (the connector portion 155c) at the other end, and the first portion is connected by being inserted into one of the first member 154 and the third member, and the second portion is opposed and connected to the other one of the first member 154 and the third member.

According to this configuration, removal and installation of the second member 155 including the duct structure 151 can be easily performed.

In addition, the second member 155 is inserted into one of the first member 154 and the third member in an inclined state in which the first portion is inserted into one of the first member 154 and the third member in an inclined state that shifts upwardly from the first portion side to the second portion side, and the second portion can be connected to the other of the first member 154 and the third member in an opposed configuration by moving the second portion downwardly from the inclined state.

According to this configuration, removal and installation of the second member 155 is simple.

In addition, the connection end (the front end 155*b*) of the first portion is formed in the inclined shape that shifts downwardly from the first portion side to the second portion side.

According to this configuration, the insertion of one end of the second member 155 can be easily performed.

In addition, the opposed end (the rear end 155*d*) of the second portion is formed in an inclined shape transitioning downwardly from the second portion side toward the first portion side, and the opposed end (the front end 154*c*) of the first member 154 or the third member to which the second portion is connected is formed in an inclined shape corresponding to the opposed end of the second portion.

According to this configuration, the other end of the second member 155 can be easily connected to the other end of the second member 155.

In addition, the second portion is provided with the cover plate 157, which covers from the second portion over the connector portion 154*b* of the first member 154 or the third member 154 or the connector portion 154*b* of the third member connected to the second portion via a sealing member, and is attached to the installation portion (the bottom wall 74) where the second portion and the connector portion 154*b* are installed.

According to this configuration, the other end side of the second portion can be secured while ensuring the sealing properties.

In addition, the sealing member includes the first sealing members 156A and 156B each having an annular shape to be provided on the periphery of the second portion and the second sealing members 156C and 156D each having an annular shape provided on the periphery of the connector portion, and the cover plate 157 is attached to the installation portion by pressing the first sealing members 156A and 156B and the second sealing members 156C and 156D.

According to this configuration, the sealing of the other end of the second member 155 can be improved.

In addition, the working machine 1 includes the cabin 14 mounted on the machine body 2, and the floor portion 75 has the floor body 77 having the inspection opening 77*a* and the openable cover 78 closing the inspection opening 77*a*, and the second member 155 extends forward through the lower side of the floor portion 75 of the cabin 14.

According to this configuration, the second member 155 can be easily inspected through the inspection opening 77*a* by removing the second member 155.

In addition, the working machine 1 is provided with the steering wheel 15, the steering post 91 supporting the steering wheel 15, and the steering column 87 covering the steering post 91, and the steering column 87 has the switch panels (the first switch panel 99L and the second switch panel 99R) arranged on the upper side of the steering column 87 and below the steering wheel 15. The switch panels (the first switch panel 99L and the second switch panel 99R) have has the first switch group 101 arranged on both sides of the steering post 91 in the machine width direction K2 and including a plurality of switches (the first switch 101A to the fourth switch 101D), the switch panel being provided to incline shifting in the outward direction of the machine body 2 as extending forward in plan view.

According to this configuration, by providing a plurality of switches on both sides of the steering post 91 in the machine width direction K2 in an inclined manner that shifts outwardly toward the machine body 2 as extending forward, the operability of the switches can be improved. In addition, the plurality of switches can be compactly placed on the upper side of the steering column 87.

In addition, the first group of switches 101 has the first switch 101A and the second switch 101B arranged back and forth on one side of the steering post 91, and the third switch 101C and the fourth switch 101D arranged back and forth on the other side of the steering post 91.

According to this configuration, the first switch 101A to the fourth switch 101D can be compactly arranged.

In addition, the first switch 101A to the fourth switch 101D are seesaw switches in which one end and the other end of the inclination direction are operated by a pushing operation.

According to this configuration, the operability of the first switch 101A to the fourth switch 101D can be easily improved.

In addition, the first switch 101A is a release switch that enables the decoupling operation of the working tool 9, the second switch 101B is a regeneration switch that activates the exhaust gas purification system, the third switch 101C is a light switch that turns the lights on or off, and the fourth switch 101D is a parking switch that restricts the movement of the vehicle during the parking.

According to this configuration, the major switches can be easily accessed.

In addition, the console 104 has the operator seat 13 arranged behind the steering wheel 15, the console 104 arranged on the side of the operator seat 13, and the operation lever 16 provided at the front portion of the console 104, the console 104 having the switch installation portion 105 provided forward and downward of the operation lever 16, and the second switch group 106 including a plurality of switches (the fifth switch 106A to the seventh switch 106C) arranged in the switch installation portion 105 in the machine width direction K2.

According to this configuration, the unintended operation of the switches arranged at the front of the console 104 by the operation lever 16 can be prevented.

In addition, the second switch group includes the fifth switch 106A to the seventh switch 106C arranged side by side in the machine width direction K2.

According to this configuration, the fifth switch 106A to the seventh switch 106C can be compactly arranged.

In addition, the fifth switch 106A to the seventh switch 106C is a seesaw switch that is pivoted back and forth.

According to this configuration, the interval between the fifth switch 106A to the seventh switch 106C can be narrowed and the fifth switch 106A to the seventh switch 106C can be compactly arranged.

In addition, the fifth switch 106A is a hold switch that keeps the hydraulic fluid flowing in a certain direction to the hydraulic attachment provided on the working machine 1, the sixth switch 106B is a float switch that puts the lift arm 8, which supports the hydraulic attachment up and down pivotally, in a floating state, and the seventh switch 106C is an unload switch that regulates the operation of the lift arm 8 and the hydraulic attachment.

According to this configuration, the operability can be improved by centralizing the switches of the working system.

In addition, the cabin 14 houses the operator seat 13, the console 104 is provided on the right side of the operator seat 13, and the cabin 14 includes a door on the right side having a transparent door window and the boarding passage 173 provided between the front pillar 142R on the right side of the cabin 14 and the console 104.

According to this configuration, it is possible to watch out of the cabin 14 from between the right side front pillar 142R and the console 104, thus improving visibility.

In addition, the working machine 1 includes the steering column 87 supporting the steering wheel 15, the brake shaft 112 rotatably supported on the steering column 87 around an axis extending in the machine width direction K2, the brake pedal 111 arranged on the side of the steering column 87 and attached to be rotatably integrated with the brake shaft 112, and the return spring 131 to return the brake pedal 111L to the unoperated position. The return spring 131 is formed of a twisted coil spring and arranged inside the steering column 87 to surround the brake shaft 112.

According to this configuration, the support structure supporting the brake pedal 111L can be compactly configured by forming the return spring 131 with a twisted coil spring to return the brake pedal 111L to the unoperated position of the brake pedal 111L.

In addition, the working machine 1 includes the brake arm 118 having the arm boss 119 fitted integrally rotatably into the outer circumference of the brake shaft 112 to actuate the master cylinder 123 by operation of the brake pedal 111L, the bearing cylinder 117 supporting the brake shaft 112, and the bush (the first bush 121) provided on the inner side of the bearing cylinder 117. The steering column 87 has the first sidewall 88L and the second sidewall 88R arranged opposed to each other in the machine width direction K2, the brake shaft 112 has the coupler portion 116 penetrating the first sidewall 88L and the second sidewall 88R and being connected to the arm boss 119. The bearing cylinder 117 is fixed to one of the first side wall 88L and the second side wall 88R and surrounds the coupler portion 116. The arm boss 119 has the bearing portion 119a inserted into the bearing cylinder 117 and supported by the bearing cylinder 117 via the bushing.

According to this configuration, the support structure of the brake pedal 111L can be made even more compact.

In addition, the return spring 131 is provided to surround the bearing cylinder 117.

According to this configuration, the support structure of the brake pedal 111L can be made even more compact.

The coupler portion 116 has the protrusion portion 116a protruding from an end of the bearing cylinder 117 to a side opposite the side of the arrangement of the brake pedal 111L in the steering column 87.

According to this configuration, another brake pedal 111R can be selectively mounted on the side opposite the side where the brake pedal 111L is positioned in the steering column 87.

In addition, the brake pedal 111L has another brake pedal 111R having the pedal boss (the second pedal boss) 114R that is coupled to the protrusion portion 116a, and the pedal boss 114R has the shaft branching portion 132 that is inserted into the bearing cylinder 117 and supported by the bearing cylinder 117 via another bush (the second bush 133) provided on the inner side of the bearing cylinder 117.

A working machine according to another aspect of the present invention, includes: a machine body; a lift arm attached to the machine body swingably up and down; a working tool to be attached to a front portion of the lift arm; a quick coupler including: a connector pin to connect the lift arm and the working tool; and a coupler cylinder to move the coupler pin to perform the connecting and to release the connecting; and a lock release valve to operate the coupler cylinder to release the connection. The lock release valve is attached to the quick coupler.

In addition, the lift arm includes a first arm and a second arm arranged at an interval in a machine width direction such that the interval is gradually widened as extending forward. The connector pin includes: a first pin provided to a front portion of the first arm; and a second pin provided to a front portion of the second arm.

In addition, the quick coupler includes: a first engagement portion detachably engaged to the working tool on the first arm side; a second engagement portion detachably engaged to the working tool on the second arm side; a first plate to connect the first engagement portion and the first pin; and a second plate to connect the second engagement portion and the second pin. The lock release valve is attached to the first plate and the second plate.

In addition, the working machine mentioned above includes a first hydraulic pipeline arranged to extend from the machine body side to a front portion of the first arm along the first arm; a first connector member to which the first hydraulic pipeline is connected, the first connector member being attached to the first plate; a second hydraulic pipeline arranged to extend from the machine body side to a front portion of the second arm along the second arm; and a second connector member to which the second hydraulic pipeline is connected, the second connector member being attached to the second plate.

In addition, the first connector member has a first take-out portion from which operation fluid can be taken out: and a first output portion to output the operation fluid. The second connector member has a second take-out portion from which operation fluid can be taken out: and a second output portion to output the operation fluid. One of the first output portion and the second output portion is connected to a head side of the coupler cylinder, and the other is connected to the lock release valve.

In addition, the lock release valve has: a main body valve to activate the coupler cylinder; and a solenoid portion to control the main body valve.

In addition, the lock release valve is constituted of a solenoid valve, and has a cover member to cover the solenoid.

A working machine according to another aspect of the present invention, includes: a machine body; a first arm and a second arm extending forward from the machine body and arranged at an interval in a machine width direction such that the interval is gradually widened as extending forward; a working tool to be attached to a front portion of the lift arm to a front portion of the second arm; an auxiliary control valve to control a hydraulic actuator provided to the working tool; a first hydraulic pipeline arranged to extend from the auxiliary control valve to the front portion of the first arm along the first arm; a second hydraulic pipeline arranged to extend from the auxiliary control valve to the front portion of the second arm along the second arm; a first connector member to which the first hydraulic pipeline is connected, the first connector member having a first take-out portion from which operation fluid can be taken out; and a second connector member to which the second hydraulic pipeline is connected, the second connector member having a second take-out portion from which operation fluid can be taken out.

In addition, the working machine mentioned above includes a connector pile connecting the first arm and the second arm. The connector pipe has a cross section shaped in ellipse elongated in longitudinal directions of the first arm and the second arm. The first hydraulic pipeline and the second hydraulic pipeline are arranged to extend below the connector pipe.

In addition, the working machine mentioned above includes a first pin connecting the first arm and the working tool; a second pin connecting the second arm and the working tool; a coupler cylinder to move the first pin and the second pin to perform the connecting and to release the connecting; and a lock release valve to operate the coupler cylinder to release the connection. The first connector member includes a first output portion to output operation fluid to a head side of the coupler cylinder, and a second connector member includes a second output portion to output operation fluid to the lock release valve.

In addition, the coupler cylinder includes a cylinder tube provided to extend in a machine width direction between a front portion of the first arm and a front portion of a second arm. The first pin is provided movably to one end side of the cylinder tube in the machine width direction, and the second pin is provided movably to the other one end side of the cylinder tube.

A working machine according to another aspect of the present invention includes a machine body, a cabin mounted on the machine body; a steering column provided to a front portion of a room of the cabin; and a brake fluid tank storing brake fluid. The brake fluid tank is arranged in the steering column.

In addition, the working machine mentioned above includes a detachable cover to detachably cover an opening through which the brake fluid tank is accessed from the front of the cabin.

In addition, the detachable cover constitutes a part of a front panel of the cabin.

In addition, the working machine mentioned above includes: a brake pedal; and a return spring to return the brake pedal to an unoperated position. The steering column has a first side wall and a second side wall provided at an interval in a machine width direction. The brake fluid tank is arranged to an inside of one of the first side wall and the second side wall. The return spring is constituted of a twisting coil spring, provided to surround a brake shaft arranged between the first side wall and the second side wall, and arranged on an inner side of the other one of the first side wall and the second side wall.

In addition, the working machine mentioned above includes a master cylinder to be operated by the brake pedal, and the master cylinder is provided to an arrangement side of the return spring between the first side wall and the second side wall.

In addition, the working machine mentioned above includes an operator seat provided in a room of the cabin; and a console provided to the right of the operator seat. The cabin includes a side panel including a transparency portion that provides outside visibility between the console and a front pillar arranged to the right of the cabin.

A working machine according to another aspect of the present invention, includes: an operator seat; a steering arranged in front of the operator seat; a steering column covering a steering post that supports the steering; an air-conditioner main body arranged below the operator seat; and a duct structure body to allow a conditioned air blown from an blower slot of the air-conditioner main body to flow. The duct structure body includes: a first duct connected to the blower slot and extending toward a lower portion of the steering column through a lower side of a floor portion of a cabin that surrounds the operator seat; and a second duct connected to a front portion of the first duct and being raised to an inner portion of the steering column.

In addition, the duct structure body includes: a first side duct that has a first blower portion through which a conditioned air is blown to a room of the cabin, the first blower portion extending from an upper portion of the steering column to one side in a machine width direction; and a second side duct that has a second blower portion through which a conditioned air is blown to a room of the cabin, the second blower portion extending from the upper portion of the steering column to the other side in the machine width direction. The second duct branches, in the steering column, to a left side of the steering post and to the right side. The first side duct is connected to a first branching portion that is one of the branching portions of the second duct. The second side duct is connected to a second branching portion that is the other one of the branching portions of the second duct.

In addition, the first side duct has a first extending portion extending upward. The second side duct has a second extending portion extending upward. The first branching portion has a tip end portion bent downward and is connected to the first extending portion from above. The second branching portion has a tip end portion bent downward and is connected to the second extending portion from above.

In addition, a front panel of the cabin includes a front window having transparency that provides front visibility. The front window has: a first lower portion located on one side of an upper portion of the steering column in front of the first side duct; and a second lower portion located on the other side of the upper portion of the steering column in front of the second side duct.

In addition, the floor portion includes: a floor main body having an inspection opening; and a openable cover to close the inspection opening. The first duct is configured to detach a portion corresponding to the inspection opening.

A working machine according to another aspect of the present invention, includes: an air-conditioner main body; and a duct structure body to allow a conditioned air blown from an blower slot of the air-conditioner main body to flow. The duct structure body includes: a first member connected to the blower slot; a second member extending from the first member; and a third portion to which the second member is connected. The second member includes: a first portion serving as one end side in a longitudinal direction; and a second portion serving as the other end side. The first portion is inserted and connected to one of the first member and the third member, and the second portion is opposed and connected to the other one of the first member and the third member.

In addition, in the second member, the first portion is inserted to one of the first member and the third member under a state where the second portion is inclined shifting upward as extending from the first portion toward the second portion, and the second portion is opposed and connected to the other one of the first member and the third member when the second portion is moved downward from the state of being inclined.

In addition, a connection end of the first portion is formed such that the connection end is inclined shifting downward as extending from the first portion toward the second portion.

In addition, an opposed end portion of the second portion is formed such that the opposed end portion is inclined shifting downward as extending from the second portion side toward the first portion side. An opposed end portion of either the first member or the third member to which the second portion is connected is formed such that the opposed end portion is inclined corresponding to the opposed end portion of the second portion.

In addition, the working machine mentioned above includes a cover plate covering, with a sealing member, over from the second portion to a connection portion of either the first member or the second member to which the second portion is connected, and is attached to an installation portion on which the second portion and the connection portion is installed.

In addition, the sealing member includes: a first sealing member having a ring shape and arranged on an outer circumference of the second portion; and a second sealing member having a ring shape and arranged on an outer circumference of the connection portion. The cover plate is attached the installation portion with the first sealing member and the second sealing member pressed by the cover plate.

In addition, the working machine mentioned above includes a cabin mounted on the machine body. The floor portion includes: a floor main body having an inspection opening; and an openable cover to close the inspection opening. The second member extends forward through a lower side of the floor portion of the cabin.

A working machine according to another aspect of the present invention, includes: a steering column supporting a steering; a brake shaft supported by the steering column rotatably about an axis extending in a machine width direction; a brake pedal arranged on a side of the steering column and attached rotatably to the brake shaft integrally; and a return spring to return the brake pedal to an unoperated position. The return spring is formed of a twisted coil spring, arranged inside the steering column, and provided so as to surround the brake shaft.

In addition, the working machine mentioned above includes: a brake arm having an arm boss rotatably fitted to an outer circumference of the brake shaft integrally and being configured to operate a master cylinder with operation of the brake pedal; a bearing cylinder supporting the brake shaft; and a bush provided on an inner circumference side of the bearing cylinder. The brake shaft has a coupler portion penetrating through the first side wall and the second side wall and being coupled to the arm boss. The bearing cylinder is fixed to one of the first side wall and the second side wall and surrounds the coupler portion. The arm boss has a bearing portion inserted to the bearing cylinder and supported by the bearing cylinder via the bush.

In addition, the return spring is provided so as to surround the bearing cylinder.

In addition, the coupler portion has a protrusion portion protruding from an end portion of the bearing cylinder toward a side of the steering column opposed to an arrangement side of the brake pedal.

In addition, the brake pedal includes another brake pedal having a pedal boss connected to the protrusion portion. The pedal boss has a pivot portion inserted to the bearing cylinder and supported by the bearing cylinder with another bush provided on an inner circumference side of the bearing cylinder.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
   a steering wheel;
   a steering post supporting the steering wheel; and
   a steering column covering the steering post, wherein
   the steering column has
      a switch panel arranged below the steering wheel on an upper surface of the steering column, and
   the switch panel has
      a first switch group including a plurality of switches arranged on opposite sides of the steering post in a machine width direction, wherein
   the plurality of switches of the first switch group include
      a first switch which is located on one of the opposite sides of the steering post in the machine width direction and which is located below a wheel portion such that the first switch underlaps the wheel portion in plan view, the wheel portion being an outer peripheral portion of the steering wheel, and
   the first switch
      is a release switch including a seesaw switch to, when pressed at a front portion thereof, enable operation of releasing connection of a working tool and, when pressed at a rear portion thereof, disable the operation of releasing connection of the working tool, and
      includes a guard member guarding the front portion of the first switch to prevent the front portion from being pressed, the guard member being configured to, when operated to unguard the front portion, allow the front portion to be pressed.

2. The working machine according to claim 1, further comprising:
   an operator seat arranged behind the steering wheel;
   a console arranged on a side of the operator seat and on the other of the opposite sides of the steering post in the machine width direction; and
   an operation lever provided to a front portion of the console, wherein the operation lever is provided with, in a grip thereof, a working-tool connection switch for operation of connecting the working tool and the operation of releasing connection of the working tool.

3. The working machine according to claim 2, further comprising:
   a lift arm provided at a front portion of a machine body; and
   a connector pin provided at a front portion of the lift arm movably along the machine width direction to connect the working tool, wherein
   the connector pin is configured to be moved along the machine width direction by the working-tool connection switch to perform the operation of connecting the working tool and the operation of releasing connection of the working tool.

4. The working machine according to claim 3, further comprising:
   a cabin surrounding the operator seat, wherein
   the cabin includes
      a first front pillar provided on one of opposite sides of a front of the cabin in the machine width direction,
      a second front pillar provided on the other of the opposite sides of the front of the cabin in the machine width direction, and
      a front panel made of a transparent material and covering a front side of the steering column, the front panel includes
    a main portion located between the first front pillar and the second front pillar and above the steering column,
    a first lower portion extending downwardly from one of opposite portions of the main portion in the machine width direction and located on one of opposite sides of an upper portion of the steering column in the machine width direction, and
    a second lower portion extending downwardly from the other of the opposite portions of the main portion in the machine width direction and located on the other of the opposite sides of the upper portion of the steering column in the machine width direction, and
the connector pin is visible from inside the cabin through the first lower portion or the second lower portion.

5. The working machine according to claim 4, wherein the lift arm includes
    a first arm and a second arm arranged at an interval in the machine width direction,
the connector pin includes
    a first pin provided to a front portion of the first arm, and
    a second pin provided to a front portion of the second arm, and
the first pin is visible through the first lower portion from inside the cabin, and the second pin is visible through the second lower portion from inside the cabin.

6. The working machine according to claim 5, wherein the first arm and the second arm are arranged at the interval such that the interval gradually widens as extending forward.

7. The working machine according to claim 5, further comprising:
    a first front wheel located outward of the first arm along the machine width direction, and
    a second front wheel located outward of the second arm along the machine width direction, wherein
the first front wheel is visible through the first lower portion from inside the cabin, and the second front wheel is visible through the second lower portion from inside the cabin.

8. The working machine according to claim 1, wherein
two or more of the plurality of switches are arranged on the one of the opposite sides of the steering post in the machine width direction, are located below the wheel portion such that the two or more of the plurality of switches underlap the wheel portion in plan view, and are arranged along a front-to-rear direction such that a longitudinal direction of each of the two or more of the plurality of switches is inclined in a first machine width outward direction as extending forward in plan view, and
the other two or more of the plurality of switches are arranged on the other of the opposite sides of the steering post in the machine width direction, are located below the wheel portion such that the other two or more of the plurality of switches underlap the wheel portion in plan view, and are arranged along the front-to-rear direction such that a longitudinal direction of each of the other two or more of the plurality of switches is inclined in a second machine width outward direction as extending forward in plan view.

9. The working machine according to claim 2, further comprising:
    a cabin surrounding the operator seat, wherein
the console is arranged on a right side of the operator seat, and
the cabin includes:
    an entry and exit door provided on a left side of the cabin,
    a right door provided on a right side of the cabin and having a door window which has transparency; and
    a boarding passage provided between the console and a front pillar provided to the right of the cabin.

* * * * *